US010628464B2

(12) United States Patent
Finnegan et al.

(10) Patent No.: US 10,628,464 B2
(45) Date of Patent: *Apr. 21, 2020

(54) REALTIME, INTERACTIVE AND GEOGRAPHICALLY DEFINED COMPUTERIZED PERSONAL IDENTIFICATION AND PAYMENT MATCHING SYSTEMS

(71) Applicants: Michael Edward Finnegan, Kingman, AZ (US); Jeffrey C. Konicek, Tolono, IL (US); Steven G. Lisa, Chicago, IL (US)

(72) Inventors: Michael Edward Finnegan, Kingman, AZ (US); Jeffrey C. Konicek, Tolono, IL (US); Steven G. Lisa, Chicago, IL (US)

( * ) Notice: Subject to any disclaimer, the term of this patent is extended or adjusted under 35 U.S.C. 154(b) by 415 days.

This patent is subject to a terminal disclaimer.

(21) Appl. No.: 15/169,862

(22) Filed: Jun. 1, 2016

(65) Prior Publication Data

US 2016/0275540 A1    Sep. 22, 2016

Related U.S. Application Data

(63) Continuation of application No. 14/927,832, filed on Oct. 30, 2015, now abandoned, which is a
(Continued)

(51) Int. Cl.
*G06F 16/29* (2019.01)
*H04W 4/21* (2018.01)
(Continued)

(52) U.S. Cl.
CPC .......... *G06F 16/29* (2019.01); *G06F 16/9535* (2019.01); *G06F 16/9537* (2019.01);
(Continued)

(58) Field of Classification Search
CPC .......... G06Q 30/0224; G06Q 30/0267; G06Q 20/325; G06Q 50/265; G06Q 30/0261;
(Continued)

(56) References Cited

U.S. PATENT DOCUMENTS 5,349,678 A    9/1994 Morris et al.
5,487,100 A    1/1996 Kane
(Continued)

FOREIGN PATENT DOCUMENTS

EP    0935378 A2    8/1999
EP    1599057 A1    11/2005
(Continued)

OTHER PUBLICATIONS

Secure Digital Payments Chapter 10 in Global Electronic Commerce: Theory and Cas Studies; MIT Press 1999 ISBN: 9780262286015 Authors J Christopher Westland and Theordore H. Clark.*
(Continued)

*Primary Examiner* — Victoria E Frunzi
(74) *Attorney, Agent, or Firm* — Law Offices of Lisa & Lesko, LLC; Justin Lesko, Esq.

(57) ABSTRACT

In general, the invention relates to a system and method of operating a shopping system to facilitate payment using a mobile device. A network is configured to include a server programmed with a personal characteristic database, a database searching algorithm, and to be coupled to a wireless communication system that is capable of communicating with the user's personal data device. The user logs on through the wireless communication system to the secure network using her personal data device, and communicates to and stores in the database personal data defining her characteristics. Either the secure network automatically identifies the first users precise geographic location, or the user himself otherwise indicates and stores in the database of
(Continued)

the network an identifying address that indicates his current specific geographic location. Personal data defining the user's characteristics are then sent to a business location at the user's location to facilitate a payment transaction.

18 Claims, 10 Drawing Sheets

Related U.S. Application Data continuation of application No. 13/633,277, filed on Oct. 2, 2012, now Pat. No. 9,178,991, which is a continuation of application No. 11/196,951, filed on Aug. 3, 2005, now Pat. No. 8,295,851.

(51) Int. Cl.

| | |
|---|---|
| *H04W 4/80* | (2018.01) |
| *G06F 16/9537* | (2019.01) |
| *H04W 4/021* | (2018.01) |
| *H04W 4/02* | (2018.01) |
| *H04M 1/725* | (2006.01) |
| *G06Q 20/32* | (2012.01) |
| *G06Q 30/02* | (2012.01) |
| *G06Q 50/26* | (2012.01) |
| *H04L 12/58* | (2006.01) |
| *H04L 29/08* | (2006.01) |
| *H04M 3/533* | (2006.01) |
| *H04M 3/54* | (2006.01) |
| *H04W 84/12* | (2009.01) |
| *G06F 16/9535* | (2019.01) |
| *H04M 3/42* | (2006.01) |
| *H04M 7/00* | (2006.01) |

(52) U.S. Cl.
CPC ....... *G06Q 20/325* (2013.01); *G06Q 30/0224* (2013.01); *G06Q 30/0261* (2013.01); *G06Q 30/0267* (2013.01); *G06Q 50/265* (2013.01); *H04L 51/04* (2013.01); *H04L 67/00* (2013.01); *H04M 1/72513* (2013.01); *H04M 1/72572* (2013.01); *H04M 3/42* (2013.01); *H04W 4/021* (2013.01); *H04W 4/023* (2013.01); *H04W 4/21* (2018.02); *H04W 4/80* (2018.02); *H04M 1/72577* (2013.01); *H04M 3/53333* (2013.01); *H04M 3/54* (2013.01); *H04M 7/006* (2013.01); *H04M 2203/1016* (2013.01); *H04M 2207/18* (2013.01); *H04M 2242/14* (2013.01); *H04M 2242/30* (2013.01); *H04W 84/12* (2013.01)

(58) Field of Classification Search
CPC ......... G06F 17/30867; G06F 17/30241; G06F 17/3087; H04L 51/04; H04W 4/021; H04W 4/023; H04W 4/206; H04W 4/21; H04W 4/80; H04W 4/008; H04M 1/72513; H04M 3/42; H04M 1/72572
USPC ............................................ 705/14.47, 14.58
See application file for complete search history.

(56) References Cited

U.S. PATENT DOCUMENTS

| | | | |
|---|---|---|---|
| 5,778,304 | A | 7/1998 | Grube |
| 5,845,202 | A | 12/1998 | Davis |
| 5,878,351 | A | 3/1999 | Alanara et al. |
| 5,905,789 | A | 5/1999 | Will |
| 5,918,180 | A | 6/1999 | Dimino |
| 5,946,618 | A | 8/1999 | Agre |
| 5,978,673 | A | 11/1999 | Alperovich |
| 6,011,973 | A | 1/2000 | Valentine |
| 6,038,451 | A | 3/2000 | Syed |
| 6,085,096 | A | 7/2000 | Nakamura |
| 6,091,948 | A | 7/2000 | Carr et al. |
| 6,104,913 | A | 8/2000 | McAllister |
| 6,144,671 | A | 11/2000 | Perinpanathan et al. |
| 6,201,974 | B1 | 3/2001 | Lietsalmi et al. |
| 6,211,799 | B1 | 4/2001 | Post et al. |
| 6,212,390 | B1 | 4/2001 | Rune |
| 6,223,018 | B1 | 4/2001 | Fukumoto et al. |
| 6,230,017 | B1 | 5/2001 | Andersson |
| 6,233,448 | B1 | 5/2001 | Alperovich |
| 6,243,039 | B1 | 6/2001 | Elliot |
| 6,249,282 | B1 | 6/2001 | Sutcliffe et al. |
| 6,317,594 | B1 | 11/2001 | Gossman et al. |
| 6,320,534 | B1 | 11/2001 | Goss |
| 6,324,404 | B1 | 11/2001 | Dennison |
| 6,333,973 | B1 | 12/2001 | Smith et al. |
| 6,356,838 | B1 | 3/2002 | Paul |
| 6,380,866 | B1 | 4/2002 | Sizer, II et al. |
| 6,389,288 | B1 | 5/2002 | Kuwahara |
| 6,424,820 | B1 | 7/2002 | Burdick |
| 6,442,616 | B1 | 8/2002 | Inoue |
| 6,487,495 | B1 | 11/2002 | Gale et al. |
| 6,539,230 | B2 | 2/2003 | Yen |
| 6,535,815 | B2 | 3/2003 | Bloebaum |
| 6,542,749 | B2 | 4/2003 | Tanaka et al. |
| 6,549,768 | B1 | 4/2003 | Fraccaroli |
| 6,584,316 | B1 | 6/2003 | Akhteruzzaman |
| 6,618,593 | B1 | 9/2003 | Drutman et al. |
| 6,625,455 | B1 | 9/2003 | Ariga |
| 6,628,938 | B1 | 9/2003 | Rachabathuni et al. |
| 6,675,002 | B1 | 1/2004 | Lipovski |
| 6,701,144 | B2 | 3/2004 | Kirbas |
| 6,716,101 | B1 | 4/2004 | Meadows et al. |
| 6,735,433 | B1 | 5/2004 | Cervantes |
| 6,754,472 | B1 | 6/2004 | Williams et al. |
| 6,756,913 | B1 | 6/2004 | Ayed |
| 6,819,919 | B1 | 11/2004 | Tanaka |
| 6,828,908 | B2 | 12/2004 | Clark |
| 6,832,093 | B1 | 12/2004 | Ranta |
| 6,839,560 | B1 | 1/2005 | Bahl |
| 6,876,973 | B1 | 4/2005 | Visconti |
| 6,909,891 | B2 | 6/2005 | Yamashita et al. |
| 6,919,792 | B1 | 7/2005 | Battini et al. |
| 6,944,447 | B2 | 9/2005 | Portman et al. |
| 6,968,179 | B1 | 11/2005 | De Vries |
| 6,975,874 | B1 | 12/2005 | Bates et al. |
| 6,983,156 | B2 | 1/2006 | Fukushima |
| 6,987,987 | B1 | 1/2006 | Vacanti et al. |
| 7,006,608 | B2 | 2/2006 | Seelig et al. |
| 7,006,833 | B1 | 2/2006 | Contractor |
| 7,042,391 | B2 | 5/2006 | Meunier |
| 7,047,202 | B2 | 5/2006 | Jaipuria |
| 7,048,183 | B2 | 5/2006 | Coughlin |
| 7,082,192 | B2 | 7/2006 | Weaver |
| 7,088,245 | B2 | 8/2006 | Guntersdorfer |
| 7,088,246 | B2 | 8/2006 | Fukuoka |
| 7,091,860 | B2 | 8/2006 | Martinez de Velasco Cortina |
| 7,091,861 | B2 | 8/2006 | Schmidtberg |
| 7,107,081 | B1 | 9/2006 | Fujisaki |
| 7,142,852 | B2 | 11/2006 | Tell |
| 7,155,238 | B2 | 12/2006 | Katz |
| 7,162,237 | B1 | 1/2007 | Silver et al. |
| 7,171,221 | B1 | 1/2007 | Amin |
| 7,284,033 | B2 | 10/2007 | Jhanji |
| 7,289,812 | B1 | 10/2007 | Roberts |
| 7,333,773 | B2 | 2/2008 | Dietz et al. |
| 7,343,317 | B2 | 3/2008 | Jokinen et al. |
| 7,464,059 | B1 * | 12/2008 | Robinson ............... G06Q 20/04 705/67 |
| 7,542,558 | B2 | 6/2009 | Klein |
| 7,577,427 | B2 | 8/2009 | Bicker et al. |
| 7,583,972 | B2 | 9/2009 | Clipsham |
| 7,673,055 | B2 | 3/2010 | Scott |
| 7,693,512 | B1 | 4/2010 | West |
| 7,693,752 | B2 | 4/2010 | Jaramillo |
| 7,747,246 | B2 | 6/2010 | Zellner et al. |

(56) References Cited

U.S. PATENT DOCUMENTS

| | | | |
|---|---|---|---|
| 7,818,415 | B2 | 10/2010 | Jhanji |
| 7,822,823 | B2 | 10/2010 | Jhanji |
| 7,840,224 | B2 | 11/2010 | Vengroff et al. |
| 8,014,763 | B2 | 9/2011 | Hymes |
| 8,090,616 | B2 | 1/2012 | Proctor et al. |
| 8,396,727 | B2 | 3/2013 | Waytena et al. |
| 2001/0022558 | A1 | 9/2001 | Karr, Jr. |
| 2001/0034845 | A1 | 10/2001 | Brunt et al. |
| 2001/0055974 | A1 | 12/2001 | Bates et al. |
| 2002/0022483 | A1 | 2/2002 | Thompson et al. |
| 2002/0034292 | A1 | 3/2002 | Tuoriniemi et al. |
| 2002/0072356 | A1 | 6/2002 | Yamashita et al. |
| 2002/0077080 | A1 | 6/2002 | Greene |
| 2002/0086676 | A1 | 7/2002 | Hendrey et al. |
| 2002/0102989 | A1 | 8/2002 | Calvert et al. |
| 2002/0138351 | A1* | 9/2002 | Houvener ............ G06Q 10/10 705/18 |
| 2002/0168964 | A1 | 11/2002 | Kraft |
| 2002/0173978 | A1 | 11/2002 | Boies et al. |
| 2002/0178087 | A1 | 11/2002 | Henderson et al. |
| 2002/0178163 | A1 | 11/2002 | Mayer |
| 2002/0194121 | A1 | 12/2002 | Takayama |
| 2003/0008671 | A1 | 1/2003 | Lundgren |
| 2003/0055689 | A1* | 3/2003 | Block .................... G06Q 10/02 705/5 |
| 2003/0114171 | A1 | 6/2003 | Miyamoto |
| 2003/0143997 | A1 | 7/2003 | Sawada et al. |
| 2003/0177072 | A1 | 9/2003 | Bared |
| 2003/0193404 | A1 | 10/2003 | Joao |
| 2003/0206102 | A1 | 11/2003 | Joao |
| 2003/0212605 | A1 | 11/2003 | Chin |
| 2003/0229445 | A1 | 12/2003 | Tingley |
| 2003/0231753 | A1 | 12/2003 | Casaccia |
| 2004/0009750 | A1 | 1/2004 | Beros et al. |
| 2004/0046646 | A1 | 3/2004 | Eskridge |
| 2004/0048605 | A1 | 3/2004 | Schaefer et al. |
| 2004/0049424 | A1 | 3/2004 | Murray et al. |
| 2004/0110515 | A1 | 6/2004 | Blumberg et al. |
| 2004/0128152 | A1 | 7/2004 | Austin et al. |
| 2004/0167794 | A1 | 8/2004 | Shostack |
| 2004/0203909 | A1 | 10/2004 | Koster |
| 2004/0203923 | A1 | 10/2004 | Mullen |
| 2004/0203940 | A1 | 10/2004 | Urs |
| 2004/0235518 | A1 | 11/2004 | Beyette |
| 2004/0248590 | A1 | 12/2004 | Chan |
| 2004/0266350 | A1 | 12/2004 | Kim |
| 2005/0003830 | A1 | 1/2005 | Campbell |
| 2005/0005172 | A1 | 1/2005 | Haala |
| 2005/0027672 | A1 | 2/2005 | Arndt et al. |
| 2005/0038876 | A1 | 2/2005 | Chaudhuri |
| 2005/0043995 | A1 | 2/2005 | Nguyen |
| 2005/0043996 | A1 | 2/2005 | Silver |
| 2005/0048987 | A1 | 3/2005 | Glass |
| 2005/0054352 | A1* | 3/2005 | Karaizman ........ H04M 3/42008 455/456.3 |
| 2005/0096023 | A1 | 5/2005 | Moore |
| 2005/0096029 | A1 | 5/2005 | Pelaez et al. |
| 2005/0130680 | A1 | 6/2005 | Northcutt |
| 2005/0181803 | A1 | 8/2005 | Weaver et al. |
| 2005/0186969 | A1 | 8/2005 | Lohtia |
| 2005/0195802 | A1 | 9/2005 | Klein |
| 2005/0210387 | A1 | 9/2005 | Alagappan |
| 2005/0215243 | A1 | 9/2005 | Black |
| 2005/0243802 | A1 | 11/2005 | Barclay et al. |
| 2005/0270246 | A1 | 12/2005 | Finn |
| 2006/0022796 | A1 | 2/2006 | Striemer |
| 2006/0047825 | A1 | 3/2006 | Steenstra et al. |
| 2006/0061453 | A1 | 3/2006 | Tuttle |
| 2006/0089913 | A1 | 4/2006 | Jaipuria |
| 2006/0099964 | A1 | 5/2006 | Barrese et al. |
| 2006/0116127 | A1 | 6/2006 | Wilhoite et al. |
| 2006/0132352 | A1 | 6/2006 | Schantz |
| 2006/0145660 | A1 | 7/2006 | Black |
| 2006/0160517 | A1 | 7/2006 | Yoon |
| 2006/0178986 | A1* | 8/2006 | Giordano ............ G06Q 20/04 705/40 |
| 2006/0214845 | A1* | 9/2006 | Jendbro ............... G01S 5/0036 342/357.64 |
| 2006/0256959 | A1 | 11/2006 | Hymes |
| 2006/0270419 | A1 | 11/2006 | Crowley et al. |
| 2006/0276210 | A1 | 12/2006 | Thomas et al. |
| 2007/0032225 | A1 | 2/2007 | Konicek |
| 2007/0093258 | A1 | 4/2007 | Steenstra et al. |
| 2008/0036653 | A1 | 2/2008 | Huston |
| 2008/0071614 | A1* | 3/2008 | Mebruer ............. G06Q 30/02 705/14.23 |
| 2008/0222038 | A1 | 9/2008 | Eden et al. |
| 2009/0233629 | A1 | 9/2009 | Jayanthi |
| 2010/0219234 | A1 | 9/2010 | Forbes |
| 2010/0287009 | A1 | 11/2010 | Francis |
| 2010/0287250 | A1 | 11/2010 | Carlson et al. |
| 2011/0225510 | A1 | 9/2011 | Lavrov et al. |
| 2012/0116959 | A1 | 5/2012 | Pitroda et al. |
| 2013/0132274 | A1 | 5/2013 | Henderson et al. |
| 2015/0215752 | A1 | 7/2015 | Helferich |

FOREIGN PATENT DOCUMENTS

| | | | | |
|---|---|---|---|---|
| WO | 97/24004 | A1 | 7/1997 | |
| WO | 2001/008059 | | 2/2001 | |
| WO | WO 0108059 | * | 2/2001 | ............ G06F 17/60 |
| WO | 2002/019750 | A1 | 3/2002 | |
| WO | 2004/036943 | A1 | 4/2004 | |
| WO | WO 2005122020 | * | 6/2005 | ............ G06F 17/30 |
| WO | 2006/101561 | A2 | 9/2006 | |

OTHER PUBLICATIONS

U.S. Appl. No. 10/121,626, filed May 8, 2003, Seelig.
Buckley and Longino; Russell Buckley and Carlo Longino on Mobile (Jul. 30, 2004).
Harte, "Introduction to Bluetooth, Technology, Market Operation, Profiles, and Services".
Hoover, "Designing a bluetooth-based wireless network for distributed shipboard monitoring and control systems" (U.S.N. A.—Trident Scholar project report).
Dating by Bluetooth, Feb. 10, 2005, Axxxr on Esato, Nov. 6, 2006 (Internet Article Print).
Press Release by Kangourouge in Telecom, Don't Be Alone on St. Valentines Day, Your Bluetooth Equipped Mobile Can Help You Find Your Dream, Feb. 8, 2005 (Internet Article Print).
Blind Dating by Bluetooth Goes Live, Apr. 15, 2004, (Internet Blog Printout).
Virgin Mobile to Launch Text Message "Dating" Game, Sep. 19, 2006 (Internet Blog Printout).
Frankwatching, Social Networking Services: de Meta List, Dec. 21, 2004, (Internet Printout).
Mobiluck, Send Messages for Free and Meet People with Your Mobile Phone, (Internet Ad Printout).
Engaget, Ryan Block, ProxiDate, meet singles over Bluetooth, Feb. 9, 2005 (Internet Blog Printout).
Wallingford, *Switch to VOIP*, O'Reilly Media, Jun. 2005.
Kolic, An Introduction to Wireless USB, Intel, Apr. 2004.
*Is Near-field Communication Close to Success*, IEEE Computer, Mar. 2006.
Near Field Communication-Interface and Protocol-2 (NFICP-2); "Near Field Communication—White Paper", ECMA, Ecma/TC32-TG19/2004/1 available at www.nfc-forum.org.
AccuTracking at www.accutracking.com.
Brandt, "Soon Your Cell Phone May Be Tracking You," PC World Magazine, Apr. 2004.
Krikorian and Gershenfeld, Internet 0—inter-device internetworking, BT Technology Journal, vol. 22 No. 4, Oct. 2004.
"Nokia 9300 Smartphone User Guide," Nokia, 2005-2006.
"Nokia 6136 User Guide," Nokia, 2006.
"Samsung SGH-T709 User Manual," Samsung, 2006.
"LG Chocolate (VX8500) User Guide," LG Electronics, 2006.
JGUI Professional, "GPS W.A.I.T We Are in Touch" Aug. 30, 2006.

(56) References Cited

OTHER PUBLICATIONS

Espinoza et al., "GeoNotes: Social and Navigational Aspects of Location-Based Information Systems," HUMLE Lab, Swedish Institute of Computer Sciences (SICS), Kista, Sweden.
IBM Technical Disclosure Bulletin, 'Automated Configuration for Country Specific Software Packages', Oct. 1, 1993, Issue No. 36, vol. 36, pp. 379-380.
Mark Fanty et al., 'City Name Recognition Over the Telephone,' pp. I-549-II552, 0-7803-0946-4/93, Apr. 27, 1993, IEEE.
Rumelhart, David E., et al., Parallel Distributed Processing; Explorations in the Microstructure of Cognition, Chapter 8: 'Learning Internal Representations by Error Propagation,' vol. 1: Foundations, 1986, pp. 318-362.
Rosenberg, A and Schmidt, C, The Bell System Technical Journal, 'Automatic Recognition of Spoken Spelled Names for Obtaining Directory Listings,' Oct. 1979, pp. 1797-1823.
Rabiner, L, et al., The Bell System Technical Journal, 'A Voice-Controlled, Repertory-Dialer System,' Sep. 1980, pp. 1153-1163.
'Bell Atlantic Nynex Mobile Debuts Unique Voice Dialing Service, Talkdial,' Bell Atlantic News Release, Feb. 15, 1996.
Telephony, Mar. 4, 1996, Meyers, 'Wireless Nation'.
Wireless Week, Jun. 24, 1996, Alleven, 'Potential Investors Lured by Demo'.
Halfbakery: gps alarm watch, Mar. 2000.
All About Symbian—Feed Your Phone (Internet Article Print).
Proxidating, FAQ, 2005, (Internet Printout).
Proxidating, Software Demo, 2005 (Internet Download Order Page).
SmartMobs, Bluetoothdating in the Netherlands, Apr. 9, 2005 (Internet Printout).
Textually.org, all about texting, SMS and MMS, Sep. 19, 2006 (Internet Printout).
Borovoy, Martin, Vemuri, Resnick, Silverman, Hancock; Meme Tags and Community Mirrors: Moving from Conferences to Collaboration, ACM Conference on Computer Supported Cooperative Work, 1998.
EXPO, Chatfield-Taylor, Best Practices: Social networking Apr. 2005 (Internet Printout).
Quick Topic, Smarter Schmoozing: nTag digital name badges, (Internet Printout).
PCmag.com, The Social Networking Tag, Feb. 27, 2004 (Internet Printout).
Randall and Sosinsky, PC Magazine Wireless Solutions, John Wiley and Sons, Dec. 2004.
Axelson, USB Complete: Everything You Need to Develop Custom USB Peripherals, Lakeview Research, Aug. 2005.
Klandrud, et al. 'Beacon Control of Radio Transmitters to Reduce Radio Frequency Interference' Motorola's Technical Developments, vol. 16, Aug. 1992.
Dryburgh and Hewett,Signalling System No. 7: Protocol, Architecture and Service, Cisco Press, Aug. 2004.
Holma and Toskala, WCDMA for UMTS: Radio Access for Third Generation Mobile Communications, John Wiley and Sons, Sep. 2004.
Davidson, Peters, and Grace, Voice Over IP Fundamentals, Cisco Press, Mar. 2000.
VoiceXML 2.0 Developers Guide, Dreamtech Software India and Dreamtech Inc, Jun. 2002.
Aggelou,"Mobile Ad Hoc Networks: From Wireless LANs to 4G Networks".
Alabacak, Analysis of Ultra Wide Band (UWB) Technology for an Indoor Geolocation and Physiological Monitoring System, Storming Media, 2002.
Baker, Glister and Glister, Bluetooth End to End, Wiley, Jan. 2002.
Barksdale, Dragon Naturally Speaking for the Office Professional, South-Western Educational, Dec. 2000.
Belanger, "Taking Wi-Fi Beyond the Hot Spot: Creating Carrier Grade Wireless Broadband Infrastructure".
Bellamy, Digital Telephony, Wiley-Interscience, Feb. 2000.
Bosse, Signaling in Telecommunication Networks, Wiley Interscience, Jan. 1997.
Boucher, Cellular Radio Handbook, Quantum Publishing, Jan. 1995.
Bray and Sturman, "Bluetooth: Connect Without Cables".
Broida, How to do Everything with your GPS, McGraw-Hill, Nov. 2003.
Carrier Grade Voice over IP, McGraw-Hill Professional, Sep. 2002.
Clark, Voice Recognition with Software Applications, McGraw-Hill, Dec. 2000.
Cooklev, Wireless Communication Standards: A Study of IEEE 802.11, 802.15, and 802.16, IEEE Press, Aug. 2004.
Curran, Wifi Security, BookSurge Publishing, Sep. 2004.
Di Benedetto and Giancola, Understand Ultra Wide Band Radio Fundamentals, Prentice Hall PTR, Jun. 2004.
Eady, Implementing 802.11 with Microcontrollers: Wireless Networking for Embedded System Designers, Newnes, Sep. 2005.
Ellis, Pursell, and Rahman, Voice, Video, and Data Network Convergence: Architecture and Design, From VoIP to Wireless, Academic Press, May 2003.
El-Rabbany, Introduction to GPS: The Global Positioning System, Artech House Publishers, Aug. 2006.
Foster and Schalk, Speech Recognition: The Complete Practical Reference Guide, CMP Books, Jul. 1993.
Freeman, Telecommunication System Engineering, John Wiley and Sons, Jun. 2004.
Garfinkel and Rosenberg, RFID: Applications, Security, Privacy, Addison-Wesley Professional, Jul. 2005.
Gast and Gast, 802.11 Wireless Networks: The Definitive Guide, O'Reilly Publishing, Apr. 2002.
Gibson, Cellular Telephone and Pagers: An Overview, Newnes, Nov. 1996.
Glover and Bhatt, RFID Essentials, O'Reilly Media, Inc., Jan. 2006.
Gratton, Bluetooth Profiles, Prentice Hall PTR, Dec. 2002.
Groom, Groom, and Jones, The Basics of 802.11, International Engineering Consortium, Jun. 2005.
GSM Switching, Services, and Protocols, Eberspaecher et al, John Wiley and Sons, Apr. 2004.
Harte and Flood, Introduction to Public Switched Telephone Networks. Althos, May 2005.
Harte, "Introduction to Data Networks: PAN, LAN, WAN, and Wireless Data Technologies and Systems".
Harte, Introduction to GSM, Althos, Oct. 2004.
Held, "Data Over Wireless Networks: Bluetooth, WAP, and Wireless LANs".
Hoffman-Wellenhof, Lichtenegger, and Collins, Global Positioning System: Theory and Practice, Springer, Sep. 2004.
Holmes and Holmes, Speech Synthesis and Recognition, CRC, Nov. 2, 2001.
Johnston, Internet Communications using SIP, Artech House Publishers, Nov. 2003.
Kaplan and Hegarty, Understanding GPS: Principles and Applications, Artech House Publishers, Nov. 2005.
Karranen et al, UMTS Networks: Architecture, Mobility, and Services, John Wiley and Sons, Apr. 2005.
Klevans and Rodman, Voice Recognition, Artech House Publishers, Sep. 1997.
Kreher and Ruedebusch, UMTS Signaling: UMTS Interfaces, Protocols, Message Flows and Procedures Analyzed and Explained, John Wiley and Sons, Apr. 2005.
Kumar, Kline and Thompson, Bluetooth Application Programming with Java APIs, Morgan Kaufman, Sep. 2003.
Lay, Khare, and Chang, Service Assurance for Voice over WiFi and 3G Networks, Artech House Publishers, Aug. 2005.
Lee, Wireless and Cellular Communications, McGraw-Hill Professional, Oct. 2005.
Liu and Li, OFDM-Based Broadband Wireless Networks: Design and Optimization, Wiley-Interscience, Nov. 2005.
Miller, "Bluetooth Revealed: The Insider's Guide to an Open Specification for Global Wireless Communications" 2nd Edition).
Minoli, Hotspot Networks: Wifi for Public Access Locations, McGraw-Hill Professional, Sep. 2002.
Minoli, Newnes, Voice Over IPv6, Apr. 2006.
Morrow, Bluetooth: Operation and Use, McGraw-Hill Professional, Jun. 2002.

(56) References Cited

OTHER PUBLICATIONS

Muller, "Wi-Fi for the Enterprise: Maximizing 802.11 for Business".
Narayanan and Alwan, Text-to-Speech Synthesis, Prentice Hall, Aug. 2004.
Noll, Introduction to Telephones and Telephone Systems, Artech House Publishers, Mar. 1999.
Nuaymi, WiMax: Technology for the Last Mile, Halsted Pr, Jan. 2007.
O'Hara and Petrick, The IEEE 802.11 Handbook: A Designer's Companion, Institute of Electrical and Electronic Engineers, Mar. 2005.
Ohrtman and Roeder, Wi-Fi Handbook: Building 802.11b Wireless Networks, McGraw-Hill Professional, Apr. 2003.
Ohrtman, WiMax Handbook, McGraw-Hill Communications, May 2005.
Orhtman, Softswitch: Architecture for VoIP, McGraw-Hill Professional, Dec. 2002.
Peterson and Davie,"Computer Networks: A Systems Approach" 3rd Edition.
Prasad and Prasad, 802.11 WLANs and IP Networking: Security, QoS, and Mobility, Artech House Publishers, Apr. 2005.
Rappaport, Wireless Communications, Principles and Practice, Prentice Hall PTR, Dec. 2003.
Reed, An Introduction to Ultra Wide Band Communications Systems, Prentice Hall PTR, Apr. 2005.
Roshan and Leary, "Wireless Local-Area Network Fundamentals".
Shepard, RFID, McGraw-Hill Professional, Aug. 2004.
Shepard, WiMax Crash Course, McGraw-Hill Osborne Media, May 2006.
Sinnreich and Johnston, Internet Communication Using SIP: Delivering VoIP and Multimedia with Session Initiated Protocol, Wiley, Jul. 2006.
Sinnreich, Johnston, Sparks, and Cerf, SIP beyond VOIP, VON Publishing LLC, Oct. 2005.
Slone, "Local Area Network Handbook," Sixth Edition.
Stallings, Wireless Communications and Networks, Prentice Hall, Nov. 2004.
Sulkin, PBX Systems for IP Telephony, McGraw-Hill Professional, Apr. 2002.
Sweeney, Apress, WiMax Operators Manual: Building 802.16 Wireless Networks, Nov. 2005 (2nd).
Sweeney, Implementing 802.11, 802.16 and 802.20 Wireless Networks: Planning, Troubleshooting, and Operations, Newnes, Jul. 2004.
Tatham and Morton, Developments in Speech Synthesis, John Wiley and Sons, Apr. 2005.
Tsui, Fundamentals of Global Positioning System Receivers: A Software Approach, Wiley-Interscience, Dec. 2004.
Wallingford, VOIP Hacks, Tips and Tools for Internet Telephony, O'Reily Media, Dec. 2005.
Walter and Gilster, "Wireless LANs End to End".
Xiao and Pan, "Wireless Lans and Bluetooth: Wireless Networks and Mobile Computing" (Wireless Networks and Mobile Computing, V. 4).
"Motorola A910 User Guide," Motorola, 2006.
All About Symbian, Proxi Dating for Siemens SX1, Dec. 22, 2004, (Internet Ad Printout).
Author unknown, http://www.bluetooth.com/document/default.asp?page=overview, date unknown, pp. 1-4, Bluetooth—Document Page, Technology Overview.
Cyberlie Underground, New Soft: Proxi Dating (S60), Dec. 15, 2003 (Internet Blog Printout).
Decker, Peter, Bluetooth SIG Automotive workgroup MRD, Bluetooth Doc. No. 8.C.999/0.8xxxxx, Dec. 3, 1999, pp. 1-1.
Dutoit, An Introduction to Text-to-Speech Synthesis, Springer, Oct. 2003 Event, Matchmaking Devices, (Internet Printout).
Lang, Applications of Ultra Wide Band Wireless, John Wiley and Sons, Sep. 2005.
Lewis, Breaking the Ice 2.0, The Boston Globe, Nov. 15, 2004 (Internet Printout).
My Symbian.com, RingMaster for S60, Dec. 31, 2003, (Internet Blog Printout).
Ohrtman, The WiMax VOIP Presentation, Monnoz Publishing, Nov. 2005.
ProxiDating, User program, Oct. 5, 2003 (Internet Printout).
Raindrop, "Defining Mobile Social Software," et al., Jul. 15, 2004 (Internet Article Print).
Shield Mark in Amsterdam, The service enables the "active search . . . " (Internet Printout).
SmallPlanet, A Social Network featuring CrowdSurfer—the first, mobile software that helps you meet the people around you., 2005 (Internet Article Print).
Stetz, Mobile Cellular Telecommunications, Lee, McGraw-Hill Professional, Feb. 1995.
Sweeney, Newnes, WiMax Operator's Manual: Building 802.16 Wireless Networks, Second Edition, Nov. 2005.
Technology, Mobhappy, Jul. 30, 2004 (Internet Article Printout).
The Cell Phone Hanbook, Aegis Publishing Group, Jun. 1999.
VCS 2030 2060 Voice Dialer User Manual, pp. 1-17, undated.
Voice Dial Information HTTP://wwwcom/swbell/shortsub/voice dial. html, undated.
"Credit History," Investopedia, Retrieved Jan. 7, 2014, from http://www.investopedia.com/terms/c/credit-history.asp.
Kylanpaa, et al., Nomadic access to information services by a GSM phone, Computer & Graphics, 1996.
Anonymous, ETSI GSM 3.40, "Digital Cellular Telecommunications System (Phase 2+) Technical Realization of the Short Message Service Point/to/Point," v6.0.0, (1998).
Anonymous, "Technical Information Bulletin 03-02, SMS over SS7, National Communication System," Office of the Manager, National Communications System (NCS TIB 03-02), (Dec. 2003).
Non-Final Office Action in U.S. Appl. No. 11/196,951, (dated Oct. 31, 2006).
Response to Non-Final Office Action in U.S. Appl. No. 11/196,951 (dated Feb. 28, 2007).
Final Office Action in U.S. Appl. No. 11/196,951, (dated Nov. 25, 2008).
Response to Final Office Action in U.S. Appl. No. 11/196,951 (dated Jan. 25, 2009).
Advisory Action in U.S. Appl. No. 11/196,951, (dated Mar. 11, 2009).
Appeal Brief in U.S. Appl. No. 11/196,951 (dated May 3, 2010).
Non-Final Office Action in U.S. Appl. No. 11/196,951, (dated Jun. 9, 2010).
Response to Non-Final Office Action in U.S. Appl. No. 11/196,951 (dated Nov. 5, 2010).
Final Office Action in U.S. Appl. No. 11/196,951, (dated Dec. 21, 2010).
Response to Final Office Action in U.S. Appl. No. 11/196,951 (dated Feb. 7, 2011).
Non-Final Office Action in U.S. Appl. No. 11/196,951, (dated Mar. 2, 2011).
Response to Non-Final Office Action in U.S. Appl. No. 11/196,951 (dated Jul. 25, 201').
Final Office Action in U.S. Appl. No. 11/196,951, (dated Sep. 15, 2011).
Advisory Action in U.S. Appl. No. 11/196,951, (dated Mar. 28, 2012).
Appeal Brief in U.S. Appl. No. 11/196,951 (dated Apr. 13, 2012).
Notice of Allowance in U.S. Appl. No. 11/196,951, (dated Jun. 25, 2012).
Non-Final Office Action in U.S. Appl. No. 11/513,515, (dated May 18, 2009).
Response to Non-Final Office Action in U.S. Appl. No. 11/513,515 (dated Nov. 18, 2009).
Final Office Action in U.S. Appl. No. 11/513,515, (dated Mar. 5, 2010).
Request for Continued Examination in U.S. Appl. No. 11/513,515 (dated Sep. 7, 2010).
Non-Final Office Action in U.S. Appl. No. 11/513,515, (dated Nov. 12, 2010).

(56) References Cited

OTHER PUBLICATIONS

Response to Non-Final Office Action in U.S. Appl. No. 11/513,515 (dated Mar. 14, 2011).
Final Office Action in U.S. Appl. No. 11/513,515, (dated Aug. 15, 2011).
Request for Continued Examination in U.S. Appl. No. 11/513,515 (dated Feb. 13, 2012).
Non-Final Office Action in U.S. Appl. No. 11/513,515, (dated Sep. 20, 2013).
Response to Non-Final Office Action in U.S. Appl. No. 11/513,515 (dated Mar. 20, 2014).
Notice of Allowance in U.S. Appl. No. 11/513,515, (dated Jul. 18, 2014).
Non-Final Office Action in U.S. Appl. No. 13/633,277, (dated Jul. 18, 2013).
Response to Non-Final Office Action in U.S. Appl. No. 13/633,277 (dated Jan. 17, 2014).
Final Office Action in U.S. Appl. No. 13/633,277, (dated Feb. 4, 2014).
Request for Continued Examination in U.S. Appl. No. 13/633,277 (dated Jul. 30, 2014).
Non-Final Office Action in U.S. Appl. No. 13/633,277, (dated Dec. 4, 2014).
Response to Non-Final Office Action in U.S. Appl. No. 13/633,277, (dated Apr. 14, 2015).
Notice of Allowance in U.S. Appl. No. 13/633,277, (dated Jun. 22, 2015).
Non-Final Office Action in U.S. Appl. No. 14/494,386, (dated Jan. 6, 2015).
Response to Non-Final Office Action in U.S. Appl. No. 14/494,386, (dated Jul. 2, 2015).
Non-Final Office Action in U.S. Appl. No. 14/927,832, (dated Feb. 10, 2016).
Response to Non-Final Office Action in U.S. Appl. No. 14/927,832 (dated Feb. 18, 2016).
Final Office Action in U.S. Appl. No. 14/494,386, (dated Dec. 17, 2015).
Response to Final Office Action in U.S. Appl. No. 14/494,386 (dated Feb. 23, 2016).
Aug. 3, 2005, U.S. Appl. No. 11/196,951, Non-Provisional Utility, U.S. Pat. No. 8,295,851 (Oct. 23, 2012).
Aug. 30, 2006, U.S. Appl. No. 11/513,515, CIP of U.S. Appl. No. 11/196,951, U.S. Pat. No. 8,880,047 (Nov. 4, 2014).
Oct. 2, 2012, U.S. Appl. No. 13/633,277, Continuation of U.S. Appl. No. 11/196,951, U.S. Pat. No. 9,178,991 (Nov. 3, 2015).
Sep. 23, 2014, U.S. Appl. No. 14/494,386, Continuation of U.S. Appl. No. 11/513,515, Pending.
Oct. 30, 2015, U.S. Appl. No. 14/927,832, Continuation of U.S. Appl. No. 13/633,277, Pending.
U.S. Pat. No. 6,819,919—Tanaka, Nov. 2004, U.S. Appl. No. 11/196,951.
U.S.—2002/0022483—Thompson et al., Feb. 2002, U.S. Appl. No. 11/196,951.
U.S.—2004/0048605—Schaefer et al., Mar. 2004, U.S. Appl. No. 11/196,951.
U.S.—2002/0178087—Henderson et al., Nov. 2002, U.S. Appl. No. 11/196,951.
U.S.—2004/0009750—Beros et al., Jan. 2004, U.S. Appl. No. 11/196,951.
U.S.—2001/0034845—Brunt et al., Oct. 2001, U.S. Appl. No. 11/196,951.
U.S.—2005/0243802—Barclay et al., Nov. 2005, U.S. Appl. No. 11/196,951.
U.S. Pat. No. 6,618,593—Drutman et al., Sep. 2003, U.S. Appl. No. 11/196,951.
U.S.—2002/0178163—Mayer, Nov. 2002, U.S. Appl. No. 11/196,951.
U.S.—2005/0210387—Alagappan et al., Sep. 2005, U.S. Appl. No. 11/196,951.
U.S.—2004/0128152—Austin et al., Jul. 2004, U.S. Appl. No. 11/196,951.
U.S.—2001/0055974—Bates et al., Dec. 2001, U.S. Appl. No. 11/513,515.
U.S.—2006/0116127—Wilhoite et al., Jun. 2006, U.S. Appl. No. 11/513,515.
U.S. Pat. No. 6,233,488—Alperpvich et al., May 2001, U.S. Appl. No. 11/513,515.
U.S.—2002/0077080—Greene, Jun. 2002, U.S. Appl. No. 11/513,515.
U.S. Pat. No. 6,701,144—Kirbas et al., Mar. 2004, U.S. Appl. No. 11/513,515.
U.S. Pat. No. 6,091,948—Carr et al., Jun. 2000, U.S. Appl. No. 11/513,515.
U.S. Pat. No. 7,333,773—Dietz et al., Feb. 2008, U.S. Appl. No. 11/513,515.
U.S.—2005/003830—Campbell, Jan. 2005, U.S. Appl. No. 11/513,515.
U.S.—2005/0130680—Northcutt, Jun. 2005, U.S. Appl. No. 11/513,515.
U.S. Pat. No. 7,289,812—Roberts, Oct. 2007, U.S. Appl. No. 11/513,515.
U.S.—2005/0096023—Moore, May 2005, U.S. Appl. No. 11/513,515.
U.S.—2003/0055689—Block, et al., Mar. 2003, U.S. Appl. No. 13/633,277.
U.S.—2005/0054352, Mar. 2005, U.S. Appl. No. 13/633,277.
WO 2001/008059—Basile et al., Feb. 2001, U.S. Appl. No. 13/633,277.
U.S. 2006/0214845—Jendbro et al., Sep. 2006, U.S. Appl. No. 13/633,277.
U.S. Pat. No. 7,673,055—Scott, Mar. 2010, U.S. Appl. No. 14/494,386.
U.S. Pat. No. 7,542,558—Klein, Feb. 2005, U.S. Appl. No. 14/494,386.
U.S. Pat. No. 6,975,874—Bates et al., Dec. 2005, U.S. Appl. No. 14/494,386.
U.S. 2004/0203923—Mullen, Oct. 2004, U.S. Appl. No. 14/927,832.
U.S. 2004/0046646—Eskridge, Mar. 2004, U.S. Appl. No. 14/927,832.
U.S. 2004/0266350—Kim, Dec. 2004, U.S. Appl. No. 14/927,832.
U.S. 2003/0212605—Chin, Nov. 2003, U.S. Appl. No. 14/927,832.
Non-Final Office Action in U.S. Appl. No. 15/590,267, (dated Jun. 11, 2019).

* cited by examiner

COMPUTING DEVICE
(SHOWN AS PDA BUT MAY BE
LAPTOP, TABLET, P.C., ETC.)

MODERN CELL PHONE W/ OR W/O
CAM AS COMPUTING DEVICE

REALTIME, INTERACTIVE AND GEOGRAPHICALLY DEFINED COMPUTERIZED PERSONAL IDENTIFICATION AND PAYMENT MATCHING SYSTEMS

CROSS REFERENCE TO RELATED APPLICATIONS

This application is a continuation of application Ser. No. 14/927,832, filed Oct. 30, 2015 (Pending), which is a continuation of application Ser. No. 13/633,277, filed Oct. 2, 2012 (now U.S. Pat. No. 9,178,991), which is a continuation of application Ser. No. 11/196,951, filed Aug. 3, 2005 (now U.S. Pat. No. 8,295,851), all of which are herein incorporated by reference.

BACKGROUND OF THE INVENTION

This invention relates to an interactive, real-time, personal matching system and associated methods. An alternative form of the invention relates to real-time, interactive personal data gathering systems and methods useful, for example, in the retail environment.

Numerous online dating systems exist, such as "Match.com," "Yahoo Personals," "eHarmony.com", "Date.com," and others. However, in each of those systems and methods, there is no ability to electronically search for and find possible matches in a fun, live, interactive and wireless format within a locally-defined geographic area, such as in a specific library, bar, coffee house, ball park, etc.

In accordance with aspects of the present inventions, participating individuals in a specifically defined social and geographic environment (such as a bar, nightclub, church function, ball-park, library, coffee shop, concert hall, etc.), each log onto a preference matching network using a wireless communication and display device, such as a standard wireless-equipped PDA, multi-function Bluetooth-enabled cell phone, or other wireless computer. (The term "PDA" is used for convenience throughout this application, but is intended to mean broadly any form of personal data or communication assistant.) Once logged onto the network, that individual's personal characteristics (such as height, weight, age, profession, religious preferences, etc.), along with his or her preferences for an ideal match, are loaded into a database or otherwise made available for real-time scanning and searching. The corresponding characteristics and preferences for other individuals currently logged live onto the same network and at the same defined geographic location are similarly made available for real-time scanning and searching. Results for likely matches are returned in a "real-time" or "live" format to interested members signed onto the network live within the defined geographic location. Then, by use of instant messaging, email, phone, visual display or other communication devices, online members of the network can locate instantly and in live format possible matches within a specifically defined geographic location, and if desired, meet face-to-face at that same location.

In comparison, current online matching systems allow users to search for matches within geographic boundaries by a radial distance from zip codes. Such existing systems do not allow for the use of secondary "branded" networks (e.g., Starbucks, Barnes & Noble, Applebees, etc.) to search for matches at specific locations unrelated to a distance from a zip code.

In a simple form, this real-time matching service could be employed on a temporary basis with a one-time subscription fee (e.g., at a nightclub, say from 8 pm to closing). In this case, individuals would pay a fee, obtain the computer communication device, enter their personal data onto a specially defined local network, and employ the live matching service only on a one-time basis on the specific network at a specific location. Any number of possible live, fun and interactive "dating games" can be played by the subscribers, as explained hereafter. After a certain number of hours or minutes, the subscription expires. In this manner, for example, a particular bar can host a "live match" evening, charge a subscription fee for those wishing to participate in the live matching program and the participants can engage in a fin, live, interactive social event.

Alternatively, and in a more complex form, this real-time matching service can be added as an additional paying subscription service to existing online web-based dating services (such as Match.com or Yahoo Personals!), for use in any locally defined wireless computer environment. In the latter case, once an individual logs onto the network over the web, and indicates his or her specific geographic location, live scanning of the database will reveal possible matches within the subset of all subscribers currently logged onto the network in the same defined geographic location. For example, the wide number of online, web-based matching or dating services such as "Match.com" or "Yahoo Personals!" could be modified in accordance with the invention to allow members with portable computers or pda's having wireless communication to pay a subscription fee for the ability to indicate their availability and current location in a manner more specifically defined than simply distance from a zip code (e.g., "Chicago O'Hare Airport," "Starbuck's Store No. 487," etc.). Other specially subscribing members who are at the same location and logged onto the system will have their data similarly available for searching.

In yet another embodiment, existing "branded entities," such as chains of hotels, restaurants, bars, coffee houses, sports leagues, etc., can establish their own dating and wireless networks and charge membership fees for the live online dating service. For example, most chains of coffee houses now offer free wireless internet access. The live personal matching system of the current invention can be programmed and established on the chain's existing website, with each location capable of being easily identified on the network. It is envisioned that such a "branded" live and interactive matching service would greatly increase loyalty and business at the franchise. For example, those who have paid a subscription fee at "Brand A" Coffee House, would continue to frequent Brand A even at different cities, so as to make use of the personal matching network. Similarly, professional sports or racing leagues (i.e., NFL, NASCAR, etc.) can employ the inventive methods on wireless or cellular networks within their stadiums or race tracks, or in bars or other social events so that they can search for matches within the more defined pool of subscribers sharing the same interest, and being at the same location. This "branding" enables those signed on to the network to have some level of basic familiarity with the other individuals frequenting the same branded locations.

In yet a further modification of the invention, the personal matching network can require consent for verification of name, date, and driver license number (or other form of identification) before access to the network is granted, and in addition, publication of the verified data to an associated police or law enforcement agency. In this manner, participants in the matching system would be effectively screened, and wanted criminals, known sex offenders or other undesirable individuals will either avoid the system (whether "branded" or not) or be tracked by the police criminal data base.

In a further embodiment of the invention, the above described systems and methods can employ GPS data and existing online dating or personal matching services to automatically indicate matches to specially subscribing individuals currently logged onto the network.

In still another form of the invention, the systems and methods of the invention can be employed in retail locations to detect the presence of a subscriber and to disseminate retail information, such as current sales, product offerings, discounts, news, etc. If desired, the existing network and wireless pda can be employed to allow the subscriber to order, pay for, and pick up items on a live basis, without waiting in line.

It is an object of the invention to provide new and improved live-format personal matching or dating systems and methods.

It is an object of the invention to provide new and improved live-format personal matching systems and methods that can be employed by existing online-dating services.

It is an object of the invention to provide new and improved live-format personal matching services that can be employed on a geographically defined wired or wireless networks using, if desired, a one-time subscription fee.

It is an object of the invention to provide a live-format personal matching service that can be employed by existing "branded" entities, such as nationwide franchises, chains or leagues.

It is an object of the invention to provide improved live, computer matching dating systems and methods.

It is another object of the invention to provide an improved interactive dating network that includes the use of visual displays.

It is another object of the invention to provide an improved interactive dating network that are accessed by paying a subscription fee.

It is an object of the invention to provide improved live, computer matching dating systems and methods that employ existing communication and computer devices.

It is another object of the invention to provide live and interactive dating games to be used in specially defined geographic locations for a subscription fee.

It is another object of the invention to provide live and interactive dating games to be used in specially defined geographic locations for a subscription fee, employing GPS systems to identify participants' location.

It is another object of the invention to provide safe, live and interactive personal matching systems and methods that verify personal data before allowing access to the network, and further, that allows as an option programming into the network a requirement that participants approve publication of their verified data with local police or law enforcement agencies.

The above and other objects are achieved by a system and method of interactive and live computerized matching in which a first user is provided with a personal data device including a wireless communication system. A secure network is configured to include a server programmed with a personal characteristic database and a database searching algorithm, and a wireless communication system at a specific geographic location that is capable of communicating with the user's personal data device. The first user is allowed to log on through the wireless communication system to the secure network using his or her personal data device, and communicates to and stores in the database personal data defining his or her characteristics and those for his or her ideal match. Either the secure network automatically identifies the first users precise geographic location, or the user himself otherwise indicates and stores in the database of the network an identifying address that indicates his current specific geographic location. The user then instructs the database searching algorithm to search for and identify other users similarly logged on to the network at the same specific geographic location. The user is able to initiate a search of the database for possible matches within the pool of other users also logged on to the network at the same specific geographic location. The secure network then indicates to the first user the results of the search.

The above and other objects are also achieved by a system and method as described, further comprising allowing any of the users logged on to the network at the same specific geographic location to initiate searches of the database for possible matches within only the pool of users logged on to the network at that same specific geographic location.

The above and other objects are also achieved by a system and method as described, further comprising allowing users logged on to the network at a specific geographic location to initiate, accept, reject and engage in instant messages amongst other users logged on to the network at the same specific geographic location.

The above and other objects are also achieved by a system and method as described, further comprising providing to users logged on to the network at a specific geographic location an indicating device coupled to the users' personal data device and configured to display visually data communicated from the secure network as a result of initiated searches or instant messages.

The above and other objects are also achieved by a system and method as described, further comprising allowing users to selectively activate or deactivate their own indicating device or the presence on the network.

The above and other objects are also achieved by a system and method as described, further comprising requiring each user logging on to the secure network at a specific geographic location to provide a form of legal identification that is forwarded to law enforcement agencies to allow identification of known criminals or sex offenders.

The above and other objects are also achieved by a system and method as described, further comprising taking each user's picture and uploading and storing the picture with the user's data stored in the database.

The above and other objects are also achieved by a system and method as described, wherein the secure network is established as part of a service offered by branded entities, including if desired at a specific branded retail location. In such a system, it may be desirable to require each user logging on to the secure network at a specific geographic to pay a subscription fee.

The above and other objects are also achieved by a system and method as described, wherein the secure network is linked to an existing online dating or matching service, the users logged onto the secure network at a specific geographic location are also subscribers to the existing online dating or matching service, the users logged onto the secure network at a specific geographic location authorize the secure network to access their data and preferences stored on the existing online dating or matching service, and the secure network conducts searches for possible matches using the data accessed on the existing online dating or matching service.

The above and other objects are also achieved by a system and method as described, further comprising allowing users to selectively activate and deactivate their presence on the network at a specific geographic location.

The above and other objects are also achieved by a system and method as described wherein the indicating device communicates to a user's personal data device using a low IF communication system. For example, the low IF communication system could operate in accordance with the Bluetooth standard.

The above and other objects are also achieved by a system and method as described, wherein the personal data device is a cellular phone equipped with a display, camera and cellular and Bluetooth wireless communication systems.

The preferred embodiments of the invention presented here are described below in the drawing figures and Description of the Drawings. Unless specifically noted, it is intended that the words and phrases in the specification and the claims be given the ordinary and accustomed meaning to those of ordinary skill in the applicable arts. If any other special meaning is intended for any word or phrase, the specification will clearly state and define the special meaning.

Likewise, the use of the words "function" or "means" in the Description of the Drawings is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to invoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

DETAILED SPECIFICATION

Several embodiments of the invention are herein disclosed including a local area embodiment, a wide area embodiment, and a so-called world embodiment. It will be appreciated that any of the features disclosed for one specific embodiment or simply generally disclosed may be construed for use in any of the embodiments in which it is possible to include. All embodiments, as previously mentioned, are real time, geographically defined, and interactive forms of the invention. Each embodiment can be used under a one-time subscription, ongoing subscription, or underwritten scenario. A typical underwritten scenario may be a business offering the service free to the user to increase the business' customer traffic for example.

In a novel use of the invention, the service provider or subscription agreement may require that personal information be verified and the user consent to publication of his personal data to law enforcement or police. Thus, users could be screened and wanted criminals, known sex offenders or other undesirable individuals will avoid the system or be tracked by the police criminal data base or other means.

Figure 1:
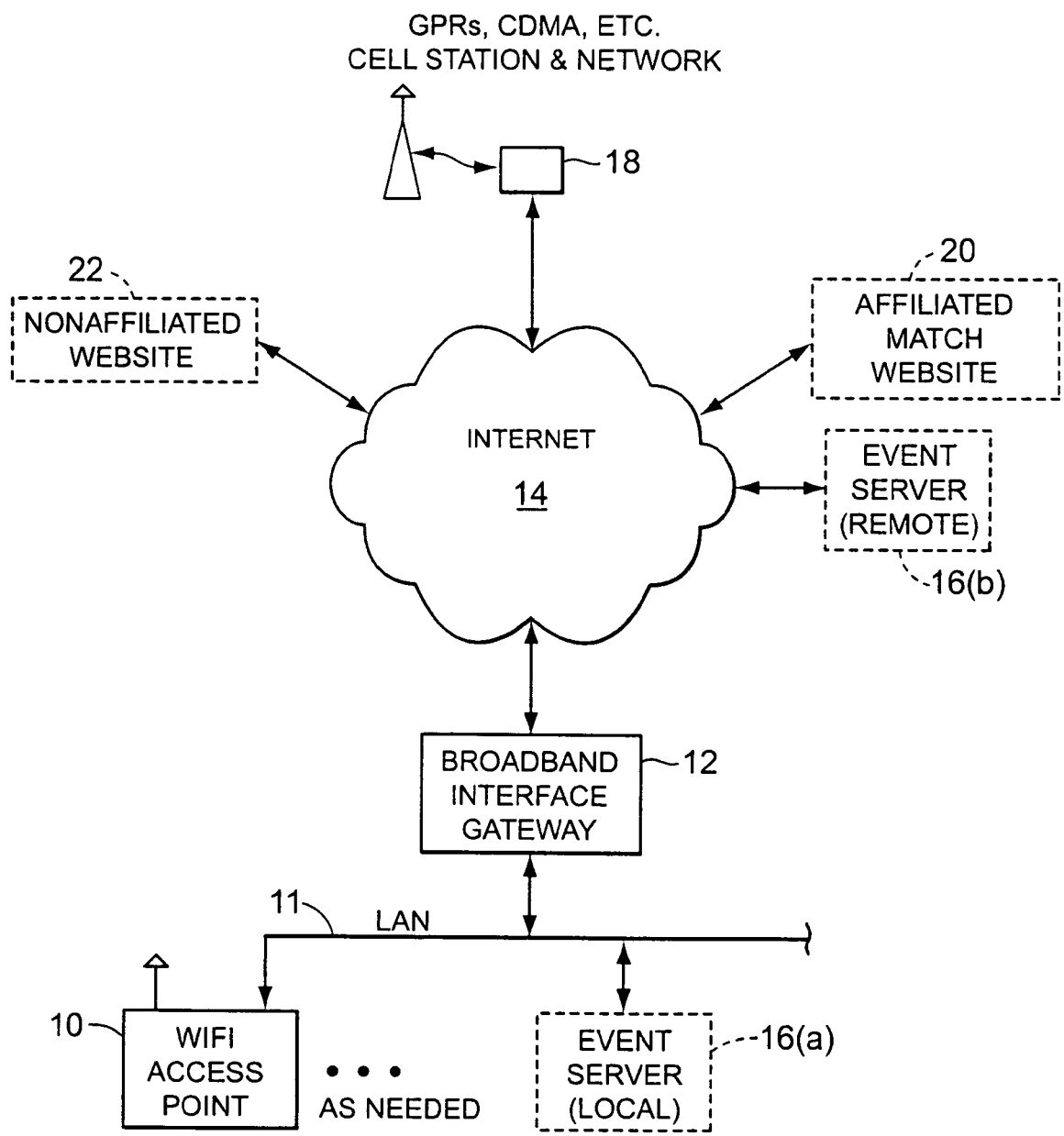
FIG. 1 depicts possible locations for the even server and the various access points to the Internet for the various embodiments of the invention.
Figure 2:
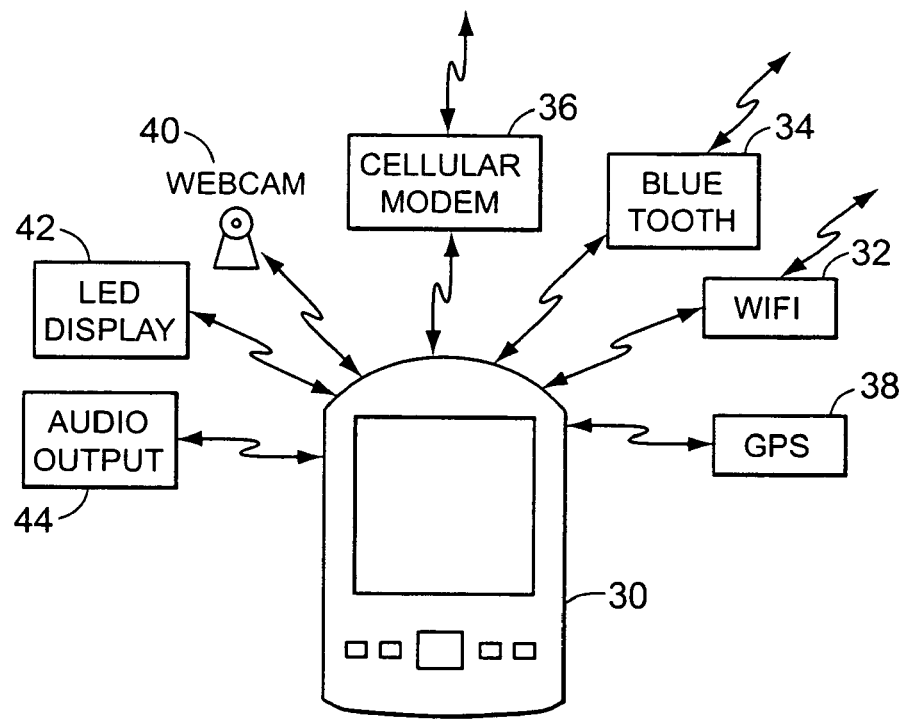
FIG. 2 shows one possible implementation of the computing device with any of several optional functional components.

As shown in FIG. 1 and FIG. 2, for the local area embodiment the device would comprise a PDA 30, tablet PC, small laptop, or any other computing device, which is outfitted with a wireless communication system, such as an 802.11 a/b/g WIFI 32, to communicate with a local server. The local computer server may be physically in-house 16a, or physically out-of-house 16b, and may be networked via a LAN 11 to one or several WIFI reception points 10 placed within the establishment. In the case of an in-house server 16a, this would typically be connected to the internet through a gateway 12 by any of several typical means including cable modem, DSL, satellite, T3, etc. If the server is out-of house 16b, the LAN with its WIFI reception points, is networked through an appropriate gateway to the internet, again, by any of several typical means and server 16a would serve only as a LAN host or may be removed completely. Thus, it is envisioned to use any appropriate method of establishing a local area network and, if desired, connection to the internet. Applicant hereby incorporates by reference the following documents regarding LAN and WIFI communication techniques: "802.11 Wireless Networks: The Definitive Guide", Gast and Gast; "Wireless LANs End to End", Walter and Gilster; "Wireless Local-Area Network Fundamentals", Roshan and Leary; "Introduction to Data Networks: PAN, LAN, WAN, and Wireless Data Technologies and Systems", Harte; "Mobile Ad Hoc Networks: From Wireless LANs to 4G Networks", Aggelou; "Data Over Wireless Networks: Bluetooth, WAP, and Wireless LANs", Held; "Wi-Fi for the Enterprise: Maximizing 802.11 For Business", Muller; "Local Area Network Handbook, Sixth Edition", Slone; "Computer Networks: A Systems Approach, 3rd Edition," Peterson and Davie; "Taking Wi-Fi Beyond the Hot Spot: Creating Carrier Grade Wireless Broadband Infrastructure," Phil Belanger, VP Marketing, BelAir Networks.

Figure 4:
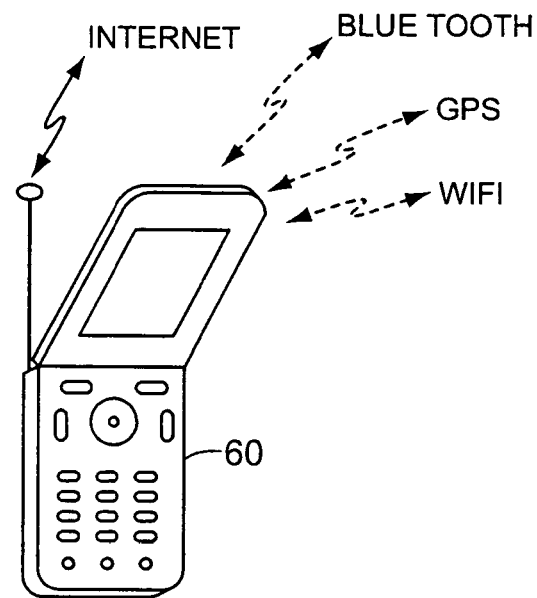
FIG. 4 shows a modem cell phone with optional functional components to be used as the computing device.

Alternatively, a cell phone could be used as the device as depicted in FIG. 4 and, while it may lack 802.11 a/b/g functionality, it is easily interfaced to the internet through cellular service providers' network 18 and geographic limitation maybe had by issuing passcodes to the user for access to a certain server on the net used for this event or to the local in-house server accessible from the internet via its gateway. However, it should also be noted that cell phones 60 are appearing on the market that are equipped with 802.11 b WIFI and these can connect to the local network through the WIFI network points. The establishment hosting the dating event may be, for the purposes of this event, associated with an affiliated match website 20 such as match.com, eharmony.com, yahoo.com. etc.

Should the establishment not wish to pay the expense of a server it could simply rent "server-time" on the net somewhere or perhaps from the affiliated match website, and it would only be required to host the Wi-Fi means connected to the network, again by any of several means, (e.g., DSL, cable modem, T1, etc). However, in a preferred form of the invention, web hosting is provided only for the participants of a specified dating event or location, so as to limit the potential pool of matches to visible attendees only. This server capability is referred to below as the event-server.

The website URL for attendees may simply be a nonpublic web address or may be password protected, the password only being given to attendees as they enter the establishment or subscribe to the branded location. For example, if "Coffee House A" has a wireless network, a password is typically required to access the network, which would allow the individual to access the website for Coffee House A and the associated wireless network for that location. Once logged on the Coffee House A website, a second password would be entered to access the live dating functions, which second password could be issued only on an underwritten or paid subscription basis.

Figure 3:
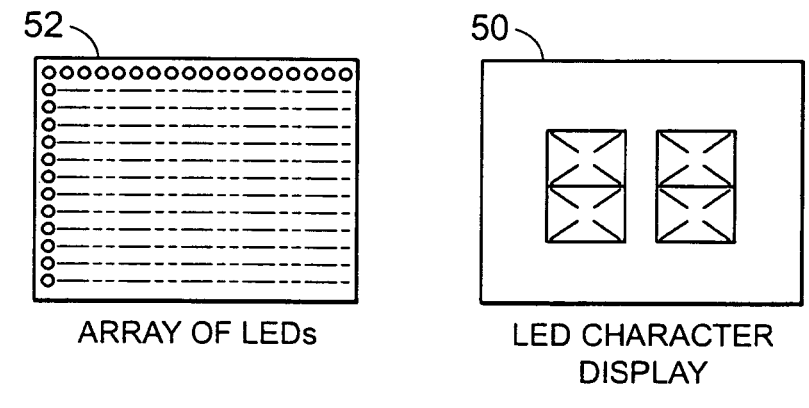
FIG. 3 describes two possible identifier display means.

The communication device 30 (e.g., a PDA, laptop computer or cell phone) may also be equipped with a small camera 40 and a Bluetooth transceiver 34 and some sort of visual 42 or audible identification device that serves to indicate visual information or whereabouts to other subscribers at the same location. With reference to FIG. 3 the indication device could be LED character displays 50, a tone device, LCD display, and LED array 52 or even a table top "number" such as those used in food service for servers to deliver ordered food to the correct table. The point of the indicator device is to allow subscribers, if desired, to have a visual indication of the persons with which they are communicating or hope to communicate, so as to determine possible compatibility. Alternatively, the form of identification can simply be a trademark associated with the branded live matching system (e.g., a sticker on the top of the laptop, a small decorative or electronic pin worn on the clothing, etc.), so that those in the same location can see another subscriber and thereafter elect to log onto the system. Such a display can be shaped or somehow customized into a recognizable form, worn on the clothing, and controlled through, for example, a wireless communication protocol such as Bluetooth. Still further, the communication device may be a specially configured display customized for the live dating event or branded location, and handed to the subscriber at the establishment only after logging onto the network through the appropriate firewalls using valid passwords.

Applicant hereby incorporates by reference the following documents describing such forms of Bluetooth communication: "Bluetooth: Operation and Use," Morrow; "Bluetooth Application Programming with the Java APIs," Kumar, Kline, and Thompson; "Introduction to Introduction to Bluetooth, Technology, Market, Operation, Profiles, and Services," Harte; "Bluetooth Revealed: The Insider's Guide to an Open Specification for Global Wireless Communications (2nd Edition)," Miller; "Bluetooth: Connect Without Cables," Bray and Sturman; "Wireless Lans And Bluetooth: Wireless Networks And Mobile Computing (Wireless Networks and Mobile Computing, V. 4)," XIAO and Pan; "Designing a bluetooth-based wireless network for distributed shipboard monitoring and control systems (U.S.N.A.—Trident Scholar project report)," Hoover.

In any of the embodiments employing some form of a controllable visual indicator built into or attached through a communication port to the user's PDA or computer, the device may be operated to flash in a certain order or display a certain character or figure, depending on the location, the user, and/or the compatibility levels of other participating users of the network. The display could also be any computer generated game characters that may optionally be associated with this live, interactive matching system, such as trademarked symbols and may also be used to help others visually identify the subscriber. Also, the aforementioned computer or electronically controlled display can indicate any of the computer-generated characters associated with the invention. Any of this functionality could be built into the computing device or could simply attach to it through some expansion means like USB or RS232 or even a custom interface which might be necessary for a cell phone or otherwise. Furthermore, not all of the aforementioned functionality needs to be present all the time. For instance, one may only need the camera to snap a user's picture upon entering the establishment not needing it again for the rest of the event. In this way, functionality may be shared, disabled, or swapped with other functionality dynamically as the need arises.

Similarly to the various display mean contemplated above, sounds may also be used as an identifier or indicator. For instance, upon selecting a match to be met, a certain sound file, or ringtone in the case of a cell phone, may be caused to play on the intended target's device (PDA or cell phone). Such sound file or ring tone may be preloaded on the device, downloaded to the device via the event server, dynamically on demand or in background or to any other schedule chosen. It is contemplated the sound file or ring tones that the target device is using may even be selected by the individual searching for the target so that he is searching for a familiar song or ring tone. Additionally, sounds or ring tones may be used to indicate status changes such as individuals leaving or becoming available, indicating a new match has been found, or perhaps a perfect match discovery. Such ringtones can also be employed to indicate the degree of match, with different ringtones associated with different degrees of compatibility.

When a participant enters the establishment, he or she either picks up one of the appropriately equipped PDAs, laptop, etc. linked by WIFI to the event server (directly by LAN or through the internet), or employs his or her own computer or cell phone as the communication device. Once appropriately logged onto the matching network, the user can instruct the event's server to obtain a copy of his profile from an affiliated match website 20 that already holds his or her profile, a non-affiliated match website 22 that has his profile, or fill out a profile information on the event server. The latter two cases are considered non-affiliated dating events. Now, the user can instruct the event's server to give him or her the corresponding match information of all the other attendees of the event who have elected to log onto the system and publish their data. The data for various attending users can be searched and sorted based on the pre-existing algorithms of the affiliated match site that the attendees of this event use. From this match information, the user can view the profiles and make a decision of those individuals logged on at the specific event that he or she would like to talk to and get to know further. Once the user decides who he or she wishes to speak with or meet, one of several scenarios can take place for them to contact each other using for examples, cameras, email, visual display or audible tones.

It is also possible for example, in the case of renting server space from an affiliated match site and using this as the event server, that there is no physical transfer of profiles from one machine to another. Instead the affiliated match site's server simply limits it's search to a subset of profiles representing the people at the event, or perhaps creates a special database for this event and moves the profiles into the searchable database.

In another form of the invention, the event may be dynamic, with people coming and going. In this form of the invention, it is envisioned that an attendee could instruct the event server to routinely perform matching at defined time intervals, say every 10 minutes or so, and inform him or her of any changes in matched people due to new participants or due to attendees leaving or otherwise becoming unavailable. This sort of dynamic matching would also easily facilitate an individual being able to enable or disable his profile from the match process based on his current status. For instance, if a participant has met someone and is engaged in a conversation, he may not want to be disturbed for the time being while he talks and gets to know the person he is with. If he later decides to allow himself to be matched, he may enable his profile again allowing others to potentially match his profile and perhaps contact him.

Figure 5A:
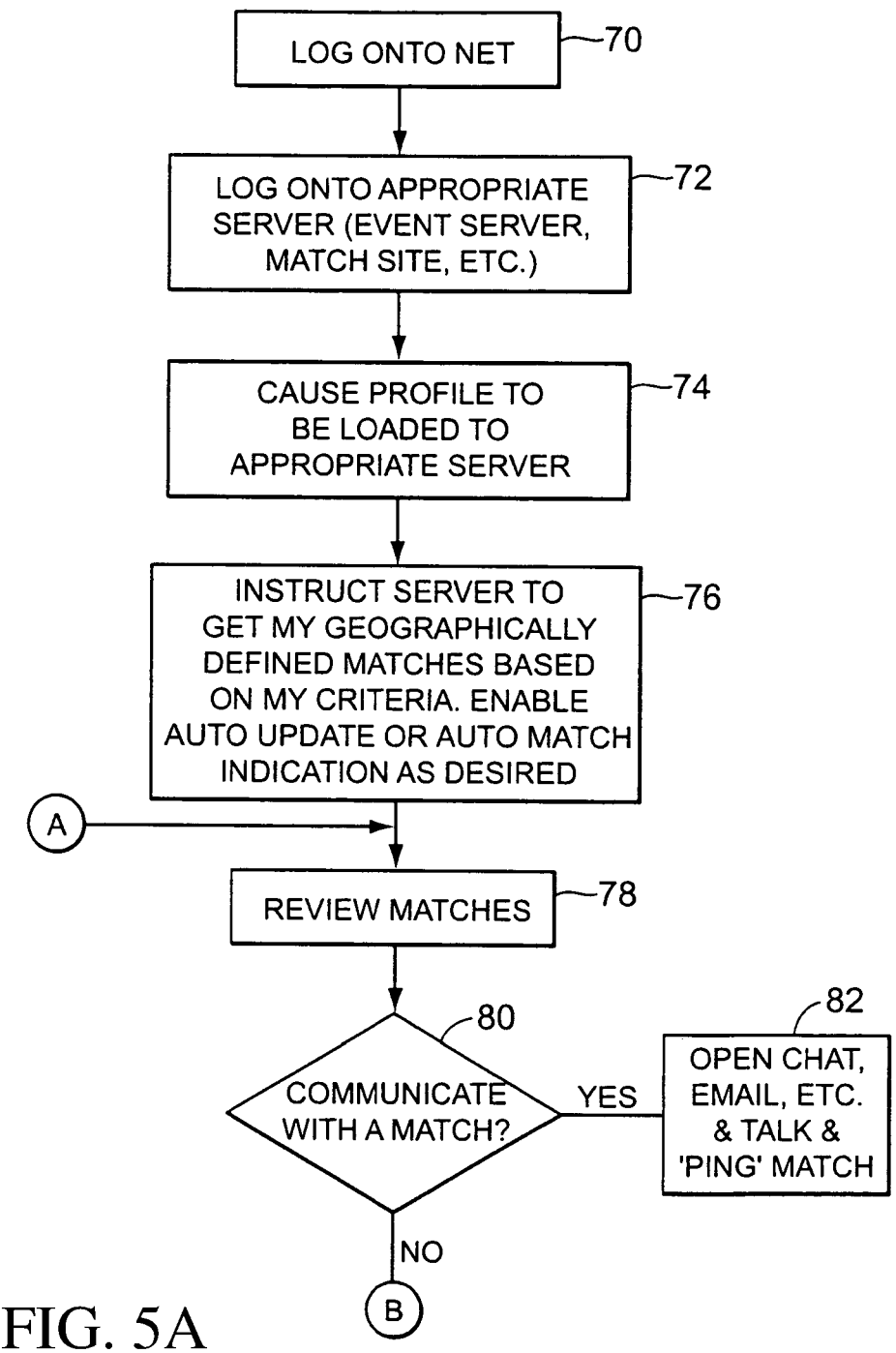
FIG. 5A-C is a flow chart for the sequence of one who is likely an initiator of a meeting or a pursuer.
Figure 5B:
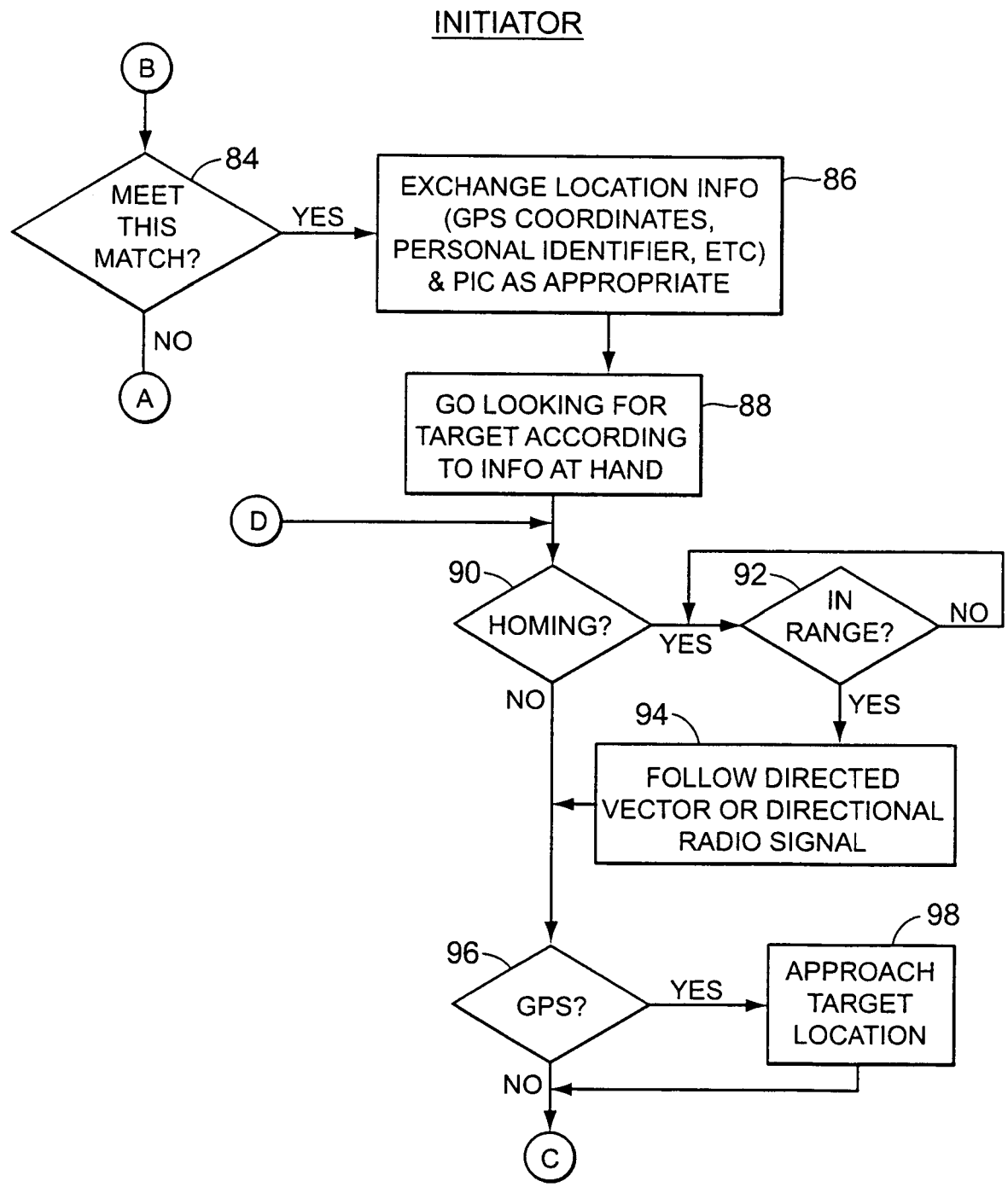
Figure 5C:
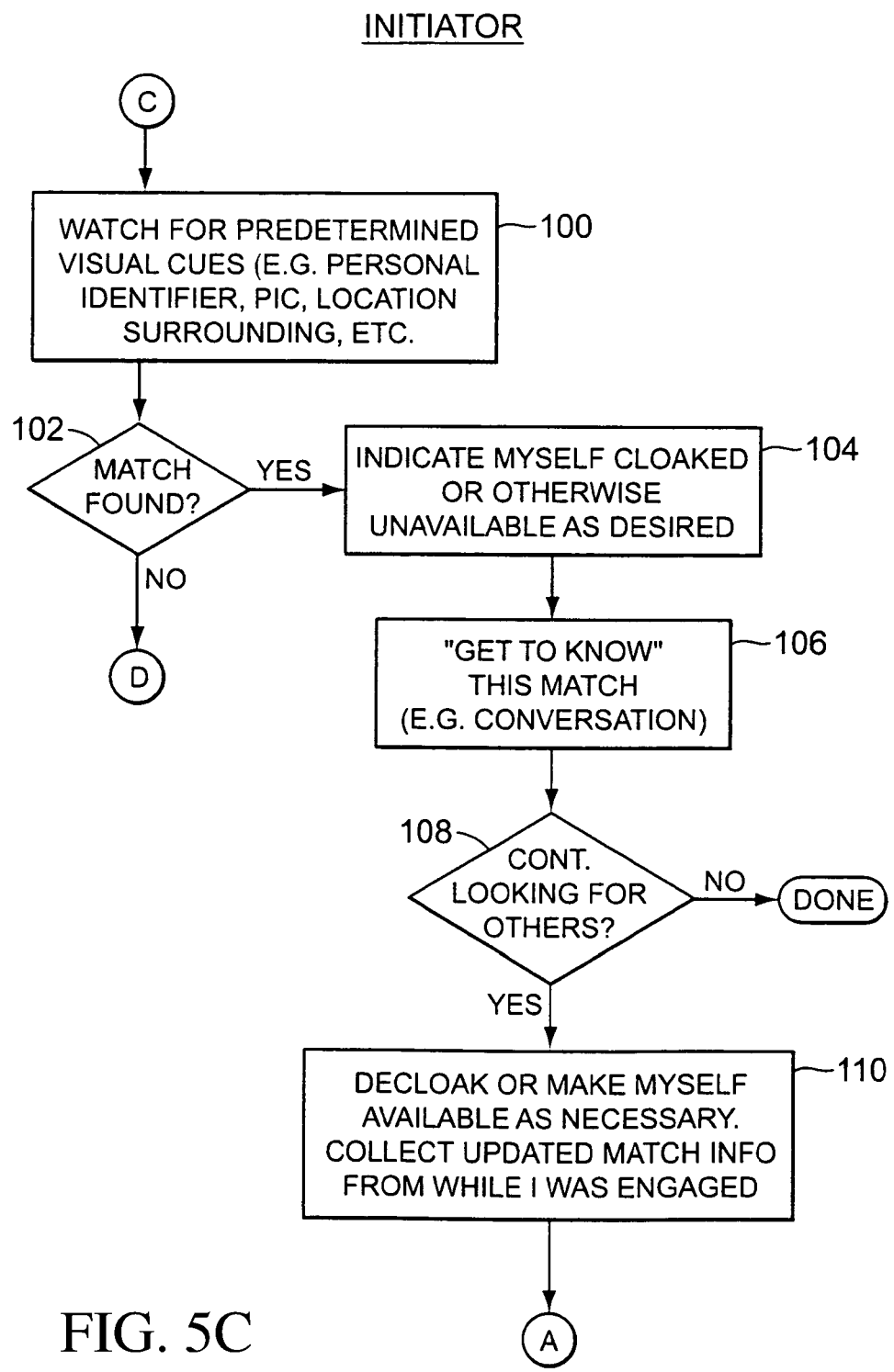
Figure 6A:
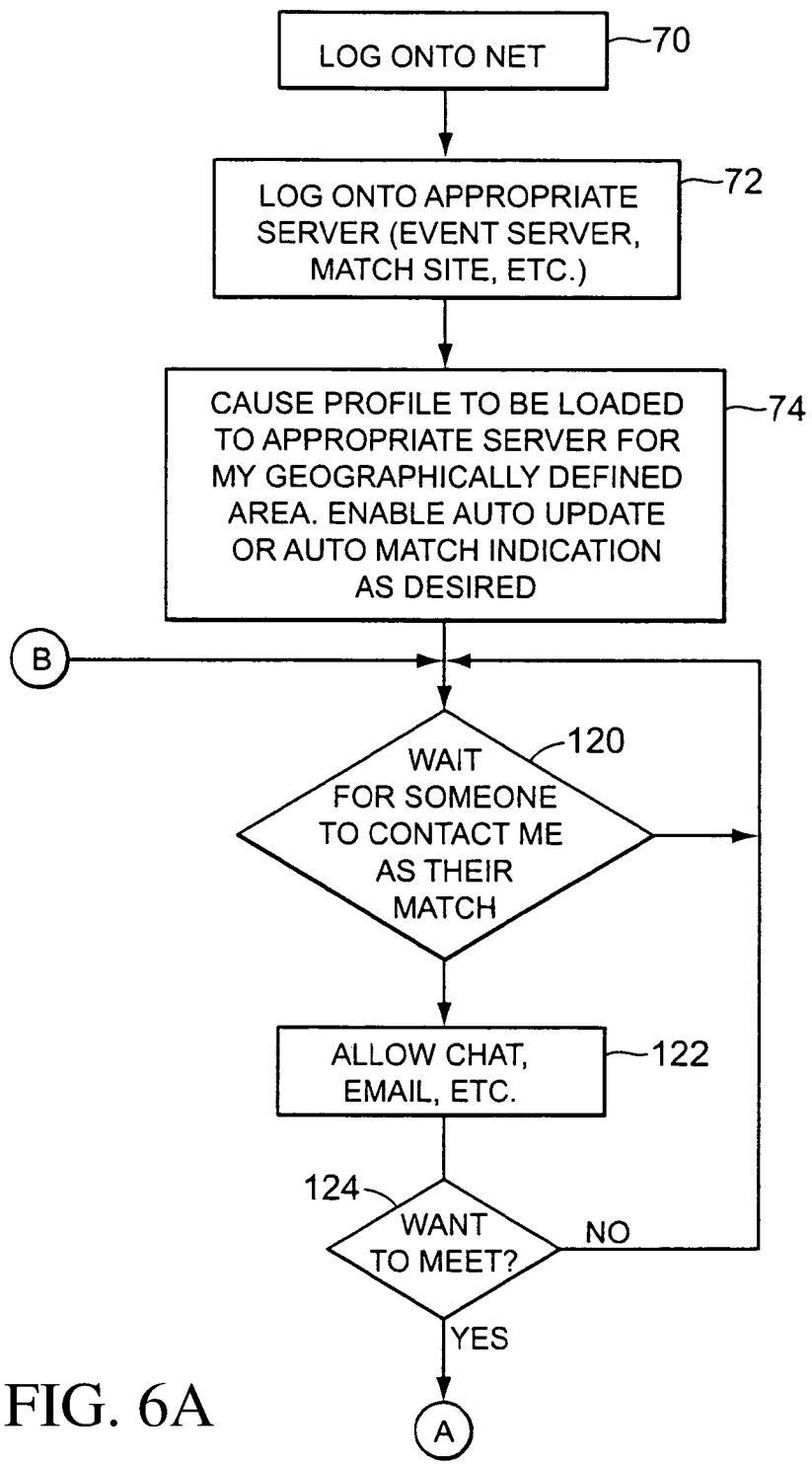
FIG. 6A-B is a flow chart for the sequence of one who is likely passive, or waiting to be contacted, e.g., the pursued.
Figure 6B:
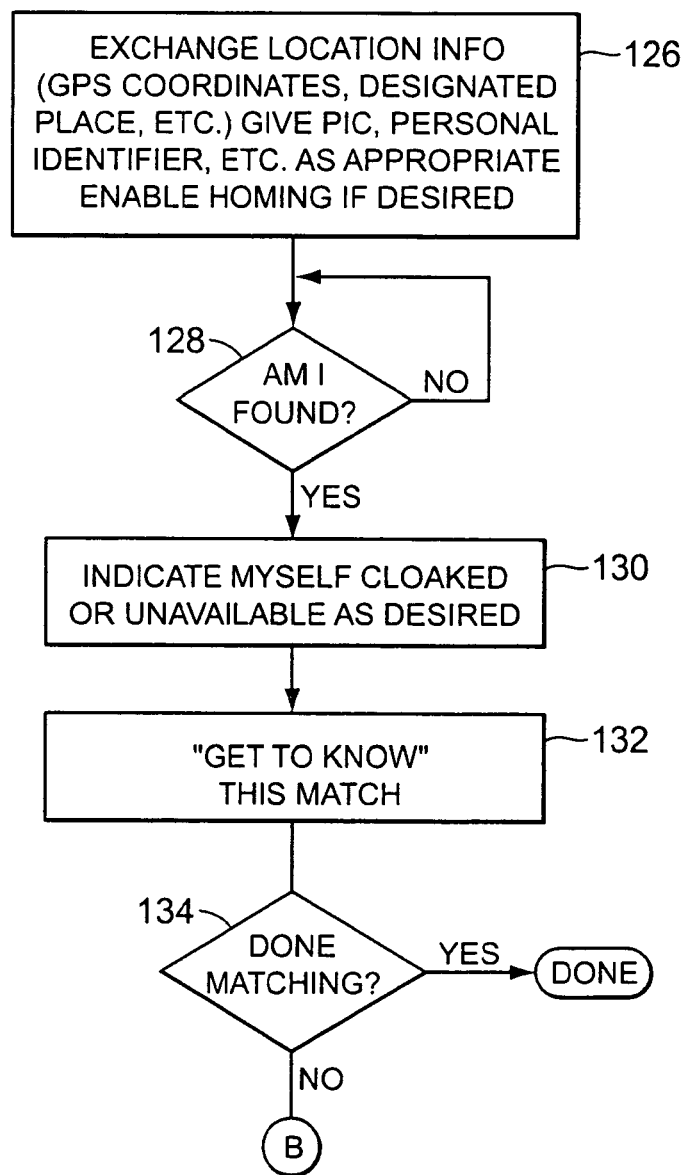

Typically, user's of the establishments dating services with fall into two categories. Those who are initiators (who actively seek and meet people) and those who are passive (wait to be contacted) FIG. 5A-C shows the likely steps for the initiator role and FIG. 6A-B shows the likely steps for the passive role. Of course, any combination of these steps may be followed as well, for instance, one may be acting as an initiator and be contacted by someone else, in which case he would assume the passive role for the purposes of the flow charts of FIGS. 5A-C and 6A-B. Once an individual has a pool of matches from which to select, the user may wish to contact one or many of his matches. In one case the individual, by using the PDA, may simply attempt to open a local chat session with the individual he would like to meet. This chat session can be hosted by the event server or by any of the several chat websites on the net (e.g., Yahoo. AOL msn, etc), as long as the individuals are connected to the internet via the PDA or computer. Alternatively, the individuals may use email, SMS, or any of several text, voice, audio, or video messaging systems or methods. The recipient of the query can either respond to the initiator's query, elect not respond to the query, or otherwise block other queries at his or her selection, for example, after seeing the person visually (due to the display device or seeing a picture on the PDA screen) or reviewing the profile of the initiator. In this way individuals can "break the ice" with one another and decide if they wish to meet further without ever having to actually meet face to face. Should they decide to pursue further, they can choose a physical place in the establishment where they would like to meet, say a specific place at the bar or specific booth or specific window or they can search for one another as described below.

In accordance with another variation of the invention, an easy method is provided for two people to meet that would be as follows: most active profiles at the major match web sites would contain photographs, and for those individuals who do not have photographs the PDA, computer, or cell phone may be equipped with a small web cam, similar to the cams embedded in the modem cell phones, whereby the user can take a picture of himself or herself and include the picture with the login or password data when he or she gains access to the network. In this manner, those individuals on the network can view pictures of the potential matches who elected to publish pictures or who enabled the viewing of their profile picture at this event. Alternatively, pictures can be stored on the event-server separately but linked to profiles through a database, or they may be stored as part of the profile, or they may be stored in each individual computing device and only disseminated by specific request. Once a user views the image or picture of a potential match, and the associated profile, the user can wander around the establishment in search of the selected individual and get to know them face to face, thereby eliminating the chat contact step altogether.

Another method of identification would be for the PDA or computer itself to have some visual rendering of an identifying mark such as a painted number or a painted letter on its case. When an individual loads his or her profile to the event server, the identifying mark associated with the PDA or computing device is likewise associated with the profile on the event server through a linked database or other means. The user may then go in search of the appropriate mark-bearing PDA or computing device associated with his or her target match. This method has simplicity that any individual not wanting to be found can simply put his PDA in his pocket or purse, out of site of other would-be matches. This method could of course be used alone or in conjunction with chat-first contact described above. Again, the individual could have full control over the dissemination of his associated "mark" through the event server as well, thus granting the user the opportunity to view the profile of a would-be match before deciding whether to grant access to him or her.

Yet another method of identification similar to the above but more dynamic would be to equip the PDA or computing device with some kind of relatively intense display device that can be easily viewed by other people at a distance. This could be an array of LEDs arranged in a grid, a simple LED character display, or some other display of that nature. When the individual picks up the PDA or computing device at the establishment, he or she chooses which identifying mark he or she would like to have displayed to the potential matches, in a manner similar to the use of personalized icons for internet instant messaging services. The selected identifying mark would be stored in the event server and associated with the user's loaded profile. This method allows the expression of individuality that seems to be an important point of single's clubs. Alternatively, the identifying characters could be computer generated game characters (either associated with the invention or not) that may be displayed by the device, or capable of being affixed to the individuals device, clothing, etc. These identifying characters likewise would be associated with the profile in a database. The individual still has complete control over which recipients or potential matches are allowed to know his or her identifying mark (as with the above examples), or the user can elect disseminate the mark throughout the location (i.e., globally enable dissemination). Still another method of identification would be to equip the PDA or computing device with a reduced-range Bluetooth transceiver having the range limited to perhaps, three to five feet, as an example. This can be done by several means the easiest of which would be to simply reduce transmitter power of each Bluetooth device. Another way would be to shield the Bluetooth antenna so as to attenuate the signal. In any case when two people wish to meet they may enable their Bluetooth transmitters to seek out each other by transmitting a unique code signal that only the other person's PDA would be aware of. Similarly the other person's PDA would also have a unique code that only the first person's PDA would be aware of. These codes would be negotiated through the server, assigned by the server, or chosen by the parties, either prior to this point or when the two parties indicate that they wish to seek out each other. Then the two can wander around the establishment in search of the other, knowing that when they are within some short distance of the each other's computing device, the devices will indicate such proximity via their display, or by other indication (i.e., audible ring tones, buzzing, etc.), thereby making the match quest something of a game, which also seems to be something of interest in dating.

Yet another variation on this approach, the Bluetooth receiver is made highly directional, while the transmitter would be relatively omni-directional. This could be accomplished through the use of a highly directional antenna for reception, and an omni-directional antenna for the transmitter, for example. Configured in this manner, the PDAs would act as directional "homing" devices. This would again add to the game effect, for example, while one person may match many seekers, the seekers, by their homing PDAs would have to locate the one match. In this manner, the first of the seekers to locate the match would have some priority (if the match is accepted) as others would have to wait their turn. Thus, an individual would have to decide to wait and risk never being considered by the one (perhaps he or she was happy with the preceding match), or elect in turn to pursue another potential match.

This gaming concept can be generalized in several different directions. One possibility is to generalize the above example of one (i.e., the "match") and many (i.e., the "seekers"), to two groups, A and B. The individuals in groups A and B each have at least one match in the other group, but, as an example, say the number of matches in group A is less than the number of seekers in group B. In this case, perhaps the game does not notify group A of matches, it being the smaller set, but does notify Group B of the matches. The event server may download the same identifying code to all of A and inform B of that code and allow only B's to look for A's. Knowing that they are in a larger set, the B's who do not find first, face some potentially difficult choices as outlined above. Likewise, the A's face decisions too in that they have to decide to accept who found them and risk losing someone better, or reject who found them and risk being stuck with nothing but worse matches.

Similarly, multiple groups can be allowed to play and not all groups must match each other. For example, men could be one group and women another group with only men being allowed to be pursuers, but where each man is pursuing a list of potential matches which may or may not be different from every other man's set. Furthermore, each man may be informed of how many of his matches are matched by others, who they are, and how many matches each has. Likewise, the woman's match set may be unique from all other women, or may share some matches, or share the entire list, etc., or not. She may or may not be informed of how many matches she has, who they are, how many other women they match, etc. at the implementer-of-the-game's discretion.

Figure 7A:
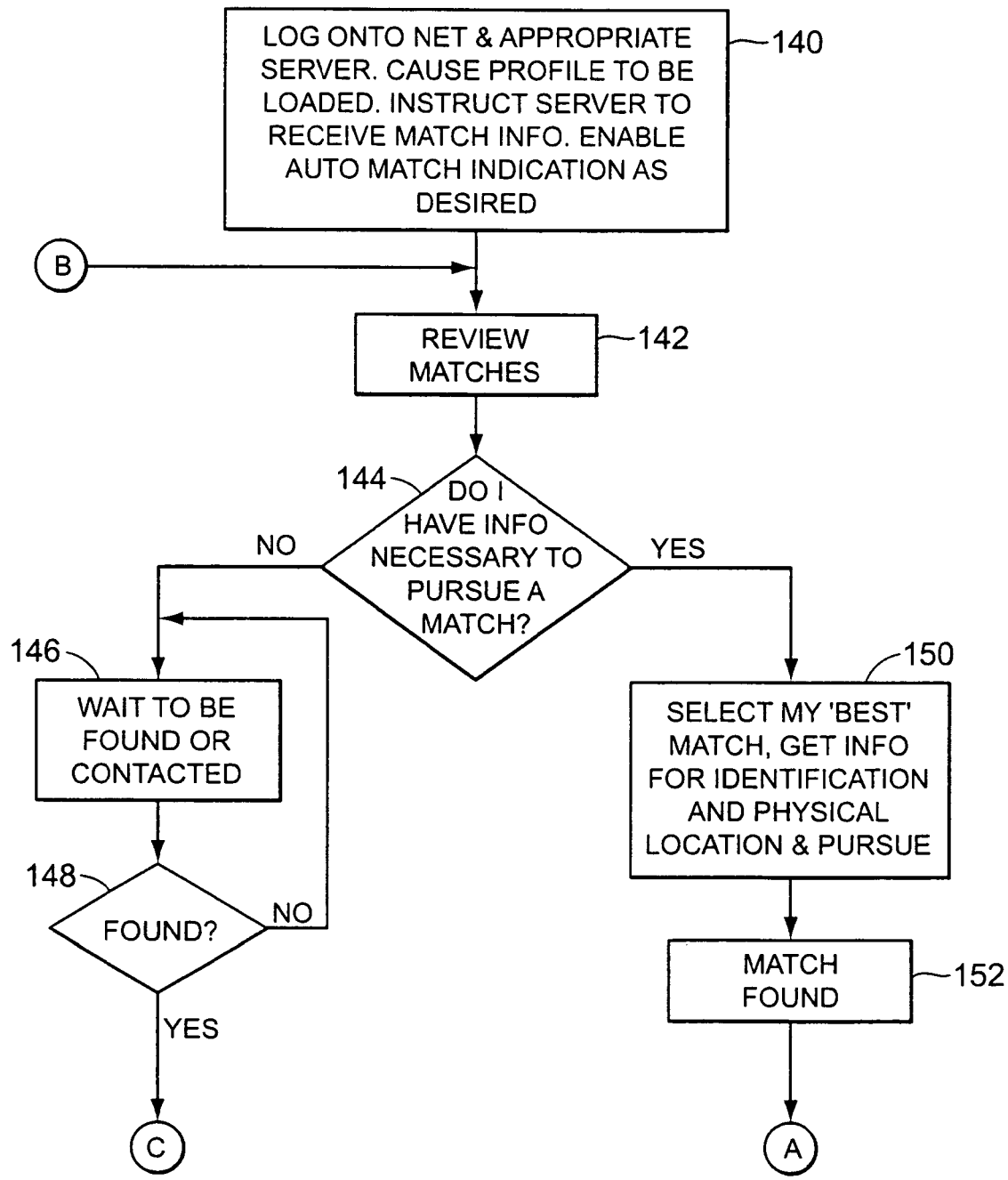
FIG. 7A-B is a flow chart for the sequence of a likely gaming scenario for both the pursuers and the pursued.
Figure 7B:
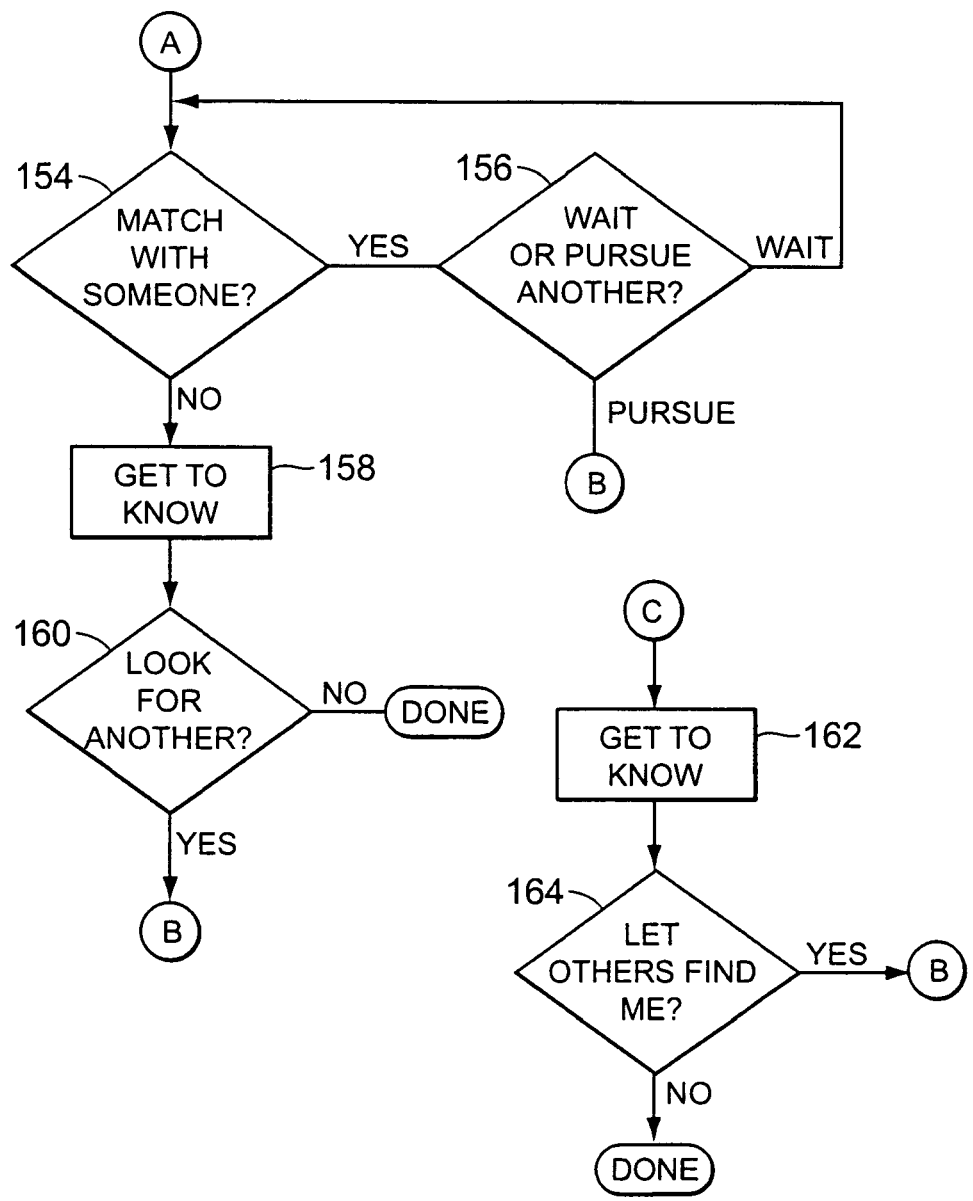

While all possibilities of implementations are contemplated, one primary game strategy is to make some individual(s) the likely pursuers/seekers and others the likely pursued/matched and the typical steps for this scenario are depicted in FIG. 7A-B. One way to do this is to allow some individuals to have superior information with regard to other individuals (about matching, location, etc) such that they are made likely pursuers. The gaming aspect may also have a risk/reward component as further enticement to play and this can be accomplished by ensuring that none of the participants have sufficient information to completely eliminate all risk (e.g., risking the best match for them, risking having a match at all, etc.) from any decision that they contemplate and ultimately make with regard to a specific match or strategy (the reward). The game can be played with all being informed of their matches, or only subsets informed, such as groups, unions of groups, intersections of groups, or subset of groups. The permutations of play are endless and these examples are offered to effectively teach the parameters of possible games but are not meant to limit the disclosure. Those practicing the invention will certainly modify these examples outlined and still be within the spirit and scope of the invention.

Yet another contemplated use of the invention is to allow or conduct an interview process between potential matches. In this scenario, everyone logged in to the system would receive information regarding their match along with specifically designated area's around the facility or defined geography to meet the match. For instance, the server could direct some people to others by sending them to the designated areas or locations. Alternatively, a schedule of areas to meet, and individuals to meet at the areas, could simply be posted or disseminated over the network from time to time. Once in the presence of a matching individual, the two could sit and engage in conversation, getting to know each other and taking notes on the positive and negative qualities of each other. These notes could be stored in the computing device and associated with the person's profile. The two could use a standardized interview form that is event or site provided, the answers to which could be used by the computing device and/or server to help rank order a persons matches based on interview results. The standardized interview results could also be used in the interim to help pare a person's match list based on results of other interviews. The getting-to-know-each-other period could be of a predetermined fixed length, say, 15 minutes, for example, at the end of which time one or both could be directed to other predetermined spots to meet another match wherein the process is repeated. At the end of the event, an individual might select his top several match choices and inform the server, automatically or otherwise, to see if any of his top choices also selected him as one of their top choices. If so, the two could then arrange a more private meeting or a date subsequently. In this way, an individual can orderly meet his matches based on profile criteria, interview them for their more esoteric or personal qualities, and refine his choices with no one's feelings hurt all the while being assured that he had a large sampling of people at the event from which to get acquainted and make his top choices. He may then determine if any of his choices also chose him.

The above process also allows negative feedback to be left should any individual act inappropriately or otherwise in violation of prescribed guidelines established either by the matching sites or the branded geographically limited locations. In this manner, much like eBay participants receive positive and negative feedback, a person's "rating" can provide some level of comfort (or discomfort) for those participating in the matching program.

It will also be appreciated that while the above examples where illustrated with Bluetooth technology, their implementation is by no means limited to Bluetooth. Practically any RF transceiver can be made to perform the necessary functionality.

In the above described scenarios, association with an affiliated match website and use of its match algorithms was described. However, it is equally feasible to practice the invention without an affiliated website and without any matching being performed. In this case, when an individual enters the establishment, the user causes his or her profile to be transferred from any website that may contain it to the event server, or the user may simply fill out a profile form on the event server. In this scenario, everyone would have access to all profiles (unless a user blocks access) and may peruse the database at his or her convenience. Alternatively, a user may elect to only view profiles of individual fitting his or her select criteria (e.g., only unmarried, petite, female, non-smokers between the ages of 30-35) with such filtering being performed by the event server. Once the individual has a list of those he would like to meet, he may attempt to meet the potential matches using any of the above-described or other available methods (e.g., contact by chat, seek by picture, seek by PDA identification, etc.).

As part of its house keeping duties, the event server is configured to keep track of newly arriving profiles and expiring profiles (either because the person left, or because he initiated a "do not disturb" lock on his profile or simply wishes to be hidden or cloaked). The event server may also periodically notify the participants on their computing devices of these changes. The notification could take the form of a special icon or sound for arrival, departure, etc. It is envisioned that such icons or sounds could be uniquely created so as to be associated with the specifically branded matching sites or locations. Additionally, in the case of the game or otherwise, the server may be required to send identification codes to the devices, arbitrate which devices can "find" other devices by enabling certain transmitters and receivers, keep track of those who may have removed themselves by finding themselves compatible with another or for other reasons, etc.

It will be appreciated that any combination of the above-described scenarios is also possible. It is further contemplated that a participant maybe be allowed to go outside of the event server in search of matches since not all people at an establishment may, in fact, be participants. For instance, a participant may ask for matches from the event server, and finding none to his liking, he may then go into a non-affiliated, non-event search scenario in which he peruses the profiles of individuals at certain websites in the hopes of finding a match at this establishment.

The primary elements common to most forms of the invention are: (1) each individual must have some form of computing device or other PDA; (2) the computing device or PDA should be connected to either a specially configured local area network and/or the internet; (3) the computing devices or PDA must be able to access an event-server containing the profiles of voluntary participants in the matching process; (4) there should be some level of security and password, or other form of qualification process that limits and monitors participant access to the event server, and also indicating approval to disseminate profile data to other voluntary and qualified participants; (5) the event server or affiliated matching service are configured with appropriate algorithms to query the qualified database of participants in accordance with selected criteria to determine matches; (6) the computing devices must have the ability to receive and indicate potential matches from the qualifying pool; and (7) those participants who match should be able to contact one another either directly or in accordance with define "game" protocols only if both participants wish to engage one another in discussion; and (8) participants should be able to disengage, hide or otherwise cloak themselves from any stage of the process if desired. In the above scenario, it is of course contemplated that the level of contact can be defined and limited by the participants in accordance with all of the various permutations discussed hereinabove.

In another preferred embodiment of the invention, the systems and methods are configured for relatively wider area networks. In that case computing means such as the PDA or laptop would be outfitted with a Bluetooth transceiver and a means to connect, preferably wirelessly, to a larger network. Such connect means could be 802.11 n or a cellular modem such as a GPRS modem or CDMA modem for the current cellular networks, or some other cellular means of connecting to the wider area network (such as the internet, or other wider branded network such as a NASCAR, NBA, etc.). The computing device may also be equipped with a GPS receiver for determining and disseminating to others (with approval or automatically) a participant's physical location. Some method of display for identifying each participant in a manner similar to those discussed above is also contemplated. Such a display device would connect to the computer device via USB, firewire, rs232, etc. or be attachable or fixable to the device, clothing, etc. However, this is not absolutely necessary particularly when using GPS and/or pictures to identify the potential whereabouts of the matches. It will be appreciated here, as it was in the last embodiment, that the modem cell phone, potentially with Bluetooth, GPS, CAM, etc. can be used very effectively as well.

The operation of the inventions in the wide area mode is very similar to that of the local area embodiment. In this case a user, through his computing means, would log onto the Internet or directly to the wide area network via the cellular modem or 802.11n device and would then login to an event-specific Web address reserved only for participants of this event (e.g., a particular NASCAR race, concert, beach location, island vacation, freeway, etc). The web address would be hosted by an event-server just as in the local area model. When the individual logs in he causes his profile to be downloaded to that event server from the affiliated match host web site or otherwise. The user would have similar controls as to the above example as well, i.e., the ability to control who can match him and when, the ability to display a picture, the ability to display a special character, the ability to have matching done dynamically (e.g. every 5 mins or even continuously) to account for attendees coming and going etc as part of his profile. Matches for that individual are then displayed on his computing means. As in the local area embodiment description, a picture may be displayed to help in identification of intended matches. The individual may open up a chat session or communicate by other methods with another member at the event as above. If they find themselves compatible, they may agree on a specific location to meet, they may decide to exchange pictures to help identify one another, they may exchange display identification codes for the led display panel, they may exchange GPS coordinates, or they may decide to home-in on each other via the Bluetooth transceiver, again, used as a proximity detector or as a homing indicator.

In the case of the Bluetooth proximity detector, the two matching participants would have each other's identifying code, and only when they are within the Bluetooth transmission range of each other, would their respective computing devices indicate that their intended matches are within range. Open range Bluetooth transmission is about 100 feet and for a wide area event that may be enough to allow for a picture or other indication to identify the match physically. However to get closer to the intended match through the Bluetooth means, once the Bluetooth transceiver has begun to receive the code of the intended match, the computing device or user may command the Bluetooth transmitter power to be ramped down in a prescribed manner so as to act something as a directional signal for the individual to get even closer as described next.

For instance once within 100 feet of the individual and the Bluetooth transceivers have found each other the individual could select through the computing device that the Bluetooth transmitter of both devices be ramped down 10%. Now only when 20% (in accordance with the inverse square law) closer to that individual will the Bluetooth transmitters again capture each other's signal. Again, the transmitter could be instructed to reduce the power by another 10% for both transmitters through my computing device and again only when 20% closer would the receivers lock. In this way, the individual is given a crude form of a homing signal or at least a directed vector (provided one keeps track of his progress) to the individual for whom one is searching. Also, the display screen of the device could be used to keep track in accordance with the above description and display an arrow or some other indication of the track.

In a similar vein, the computing device could keep track of the received strength signal indicator (RSSI) commonly found in Bluetooth transceiver chip sets and as the person wanders around, software on the computing device would determine the likely direction of the target. One such method of determining target direction would be for the computing device to analyze the gradient of the RSSI map (automatically created from a number of sample locations) and could then determine the most likely direction to the target by finding the minimum gradient with maximum RSSI.

GPS is particularly helpful for the wide area event because it gives a person's location at relatively short periodic intervals. The computing devices may be programmed such that once parties decide to meet, the GPS coordinates of each are constantly transmitted to the other via their internet connections or their direct wide area network connection. In this way, the two can find each other even with neither being stationary. While current GPS resolution is limited to about 10 feet, a picture on the display device is more than sufficient at this distance to find the target individual. Once close enough, a picture may serve to identify the individual visually or both may elect to use some other form of visual display (e.g., an LED display or pin attached to the article of clothing) which is easily visible and which displays some sort of unique symbol that can be identified. This symbol may be given only to selected individuals or be globally available at the choice of the one who holds it.

As with the local area event, the wide area event can work quite well without an affiliated and pre-established internet matching service. Its operation would be quite similar to that of the local-area, non-affiliated dating event in which the event server would simply obtain profiles from websites on the internet and run proprietary or open-source matching algorithms. Of course, combinations of both affiliated and non-affiliated scenarios are anticipated as well. Finally, the dating games as described under the local area event description can be just as easily implemented for the wide area event as well. And, just as in the case for the local area event, while the descriptions here were to some extent illustrated with Bluetooth technology, the implementation is certainly not limited to Bluetooth technology for those intended functions. Any RF transceiver can be made to perform the necessary functions, including, AM, FM, etc. radio technology.

Yet another form of the invention requires very little hardware modification to existing computing devices, and in essence requires no hosting except for the main match website or a server on an establishment's website that is accessible via the internet. For example, modern cell phone already have the capability of connecting to the Internet, using a micro browser, and likewise, include a camera, Bluetooth communication systems, and GPS. In that case all the hardware that is needed is potentially in the cell phone and the cell phone number could be an individual's unique identifier.

In this embodiment, a local server on an establishment's LAN (such at Coffee House A) is employed in addition to an affiliated match website. Of course, the local server could be physically located anywhere and is not physically constrained in any sense, but is at least logically associated with a particular branded group or establishment where individuals that are actively searching for matches are willing to be found. Each such participant would allow his or her profile to be stored on that server and could selectively enable or disable access to the profile to allow searching to be conducted by potential matches. In that case the server performs the match of the profiles and then the individual can look at those matches through his cell phone via a micro browser. The individual could have a picture downloaded for identification, could chat with the individual either by SMS, or any of the cell-ready chat services such as Yahoo, AOL, MSN, etc., or by email, etc. to further get acquainted with the individual. If desired, the two individuals could decide on a specific place to meet and could use the Bluetooth, GPS or other homing methods discussed previously to help locate each other. This form of the invention could be used by specific franchises or branded groups as a subscription service accessible anywhere in the world (e.g., to find a NASCAR fan in England). It would be of potential great benefit for travelers who are single looking for matches within a more-limited universe of interest and geographic area.

Of course to implement the network in an area that is relatively unlimited from a geographic perspective (in the most extreme case, worldwide), some method for narrowing searches would be necessary. In this case, it would be preferable to use an existing internet based database or matching network, or the network of an otherwise branded establishment. Most of these services are configured to enable users of the network to search for and identify particular locations within certain geographic definitions. However, the disclosed inventive method contemplates limiting searching to both geographic boundaries and at least a commonly defined geographic characteristic (such as certain Starbuck's Coffee House in New York City or a Holiday Inn in Chicago, etc.). These networks can further limit participation to a predefined radius centered on a current physical location, participating establishment (building, apartment, hotel), or any other geographically defined place (e.g., concert hall, stadium, mall, race track, etc.). Most internet based matching services already allow some form of geographic focusing of the search using proximity to an existing zip code. The current invention comprises modifying these databases and search tools to identify participating branded establishments, street addresses or groups located around the world. For example, if Starbucks elected to participate in the matching service, the existing database would be loaded with data enabling users to search for matches at particular Starbuck's locations.

More generically, users may input a specified ZIP code and instruct the system to identify matches within a defined radius of a set number of miles from the zip code. Zip codes are almost uniformly in use now throughout the world though they may have different format than is used here in the US. It certainly is easy enough for an individual once in a certain location to find out his or her postal code (which is the generic name for ZIP code.) Other scenarios include defining the search space as Starbucks store #347, Indianapolis raceway, Soldier Stadium, the Ritz-Carlton hotel, etc.

It is also contemplated that an individual's profile could be rendered available and unavailable automatically based on the person's whereabouts. For instance, an individual, upon entering an establishment may have his presence sensed by local means and his profile made available for matching to those people looking for matches who are at this establishment. To illustrate, an individual may subscribe, for example, to a matching service provided by Chain X (Starbucks, NASCAR, Holiday Inn, etc.). Upon entering an establishment of Chain X, the person's presence could be sensed by any of several methods. For example, the establishment may provide wireless networking means (such as Bluetooth, 802.11 a/b/g, etc) and the person's cell phone could be configured so that it automatically negotiates with the wireless networking means and upon completion of a predetermined authentication process and identification of the individual (for example, by his cell phone number, an assigned user number, his name, etc), the individual's profile would be marked as available and present in that establishment. As a further safeguard, the individual may be queried and required to confirm making his profile available to searches of this establishment or chain if desired. Additionally, the individual could be queried as to whether he would like to try the latest offering of the establishment (say, the latest flavor of the month in the case of a Starbucks), he could confirm or deny and receive an order number if he should confirm. He could even pay for the item via credit card over his cell phone, for example.

A person could conceivable belong to any number of 'local' or corporate dating networks confident that users in those locales or establishments can search and match him no matter where he is, automatically. Thus, he could be in a coffee shop, recognizable and searchable to clients there, leave, arrive at a hotel, have his profile automatically rendered available to clients there, etc.

A further use of this aspect of the invention provides that the user's order habits or purchase habits within this chain or establishment be tracked by any means and that offers or information made to him be tailored according to his previous habits. In this sense, the cell phone serves a similar purpose to a cookie as used by internet sites. For example, a computer server associated with the chain store may be informed by the wireless networking means, that cell number xxx-xxxx (or John Doe or user number yyyyyy or media access number (MAC) zzzzzzzz) has just arrived. The chain server may then search its user database and tailor a query to the individual asking the individual if he wants his usual food, beverage, the special of the day, etc. In another example, an individual may enter a chain store (such as a WalMart, Sears, Target, etc), have his previous buying habits recognized by the chain store and then be informed of specific 'specials' or sale items that may be of interest to him based on his previous shopping purchases or habits. He may also be informed of certain coupons or rebate forms that are only available at this store.

In many cases, where the individual is identifiable and the establishment has an internet and traditional brick-and-mortar presence and where the local network is connected to the network, a person's online habits and interests could be used to determine what information is sent to his cell phone by the local network and vice versa (that is, what information is sent to him via the internet when logged on there). For instance, a Barnes and Noble local network, sensing an individual entering and identifying him, may reference his internet habits and/or purchases to tailor information sent to him on his cell phone by the local network. As an example, it may be known from his internet purchases that this individual is a sci-fi fan and so he is made aware of the latest sci-fi releases or perhaps the person purchased a book that was back-ordered at the time of ordering from the website but that this store happens to have and so he is informed that he may pick up his book at this establishment. Similarly, a person may have tried to purchase an item online but cancelled his order due to too long of delivery time, expense, etc. but that item is available in the store, or is on sale, etc., and so the local network can inform him of these facts so that the establishment has an attempt to recoup lost sales.

In yet another example, an individual may enter a chain store but not be individually identifiable. That is, it may only be possible to identify that a new cell phone has entered the establishment (by, for example, negotiating with its Bluetooth signal or WIFI signal but not be able to identify anything with regard to its owner. In this case, generic store information, sales information, specials information, etc can be streamed via the LAN network connection over the wireless interconnect to the cell phone to inform the user. In this case, the individual could be offered special enticements in order to have him 'join' the establishment's network so that he can be tracked in the future (e.g., receive a free liter of diet Coke for joining Walmart's preferred buyers network.) Even if he should elect not to join the establishment's network, the invention contemplates the storage of cookie, that is, a small file or marker data that helps identify this cell phone or user on subsequent visits to the establishment's network, so that the next time he enters the establishment, some different advertising, perhaps targeting his return, issuing a welcome back message or at least recognizing his previous visit(s), can be sent to his cell phone from the local network via wireless interconnect.

The present invention may also serve as a programmable point of sale terminal. An individual, entering an establishment has the presence of his cell phone sensed by its emission of the Bluetooth, WIFI, etc. signal. The establishment's network negotiates and connects with the individual's cell phone and upon such connection; the establishment downloads order information to the cell phone and/or asks the individual to place his order. For example, most fast food establishments have their order menus plainly visible to customers. With the present invention, upon entering, say a McDonald's restaurant, the user is connected to the in-house network and walked through the ordering process. For instance, he may be asked if he wishes to order the familiar McDonalds Meal Deal and if so, select which one (by number). Alternatively, he may choose to order specific items, in which case the network may ask him which sandwich he wants, ask if he has any modifications to the standard sandwich, whether he wants French Fries, whether he wants a drink, dessert, etc. Advantageously, the network can walk through the ordering process consistent with the establishment's current process, procedures or methods of ordering, thus seamlessly cutting out human order takers for at least a large portion of orders.

Automatically determining that the individual has left the network can be used to advantage as well. It is quite easy to make such determination. For instance, most large stores now have foyer entrances (where perhaps shopping carts, vending machine, etc. are kept. Sensing that an individual has entered a foyer by his Bluetooth or WIFI signal and knowledge by the system that he was just in the store or is still connected to the network could be used to determine that he is leaving. Alternative, sensing his Bluetooth or WIFI signal passing a certain point (with a localized sensing device, i.e., a Bluetooth or WIFI receiver desensitized in a way that it will sense the signal only when in very close proximity to the transmitter) is another way of sensing a person's probable leaving. This type of sensor could be placed at the same place as the familiar merchandise scanners that are used to detect that an item is leaving the store without having been paid for. Both of these methods have the advantage that the user is still connected to the local network and sensed that he is exiting, leaving some time for the network to send exit-information to his cell phone. Other methods for exit detection that determine exiting but that have the user no longer connected to the local network of the establishment would be self sufficient, sending exit-information to the person concurrent or slightly after sensing him leaving.

Possible scenarios that may take place on exit sensing include a hotel chain can schedule house keeping services based on whether the individual renting a room is in-network (on premises) or out-of-network (off premises). A chain store's network, upon sensing an individual leaving, may cause a special ring tone associated with that chain to be played on the user's cell phone by downloading it to the cell phone via the wireless network connection. A Starbucks coffee shop may elect to send to the person's cell phone via its network that he is the millionth customer served, or McDonalds may send to his phone that he was the 98,578,438,230.sup.th hamburger sold, for example. A grocery store chain may inform the individual via it's network to his cell phone, that he was the 100,000.sup.th customer and that he can return and receive a cash check for $1000.00 just for being that customer. A bookstore chain might inform a customer that this is his 20.sup.th book he purchased and he is entitled to a free book the next time he visits. A submarine sandwich shop may tell the individual that he has purchased his 6.sup.th sandwich and that the next one is on the house. Local and chain establishments can advertise these features as a way to entice the public to join their networks (and thus be tracked) and in some cases, if the benefits of being part of the network are sufficient, the establishment may be able to exact a subscription fee (for example, dating services, or a bar may offer to have a subscription to its free drink network offering, for example, every 50.sup.th customer on Fridays a free drink). Advertising of these features can also be used just to increase traffic at the establishments, requiring or not requiring, registration.

It is important to note that any of these aspects of the present invention do not require the use of a dating service to be useful however they may be quite profitably used with such service. Similarly, connection with the internet is not necessary, this aspect of the invention being utilizable in a local network environment only, but connection to the internet by the local network can greatly enrich the experience of the individual provided by the establishment in many cases. All that is required is a local network, a wireless interconnect, and a individual with a cell phone equipped with wireless interconnect technology (e.g., Bluetooth, 802.11 a/b/g WIFI, etc) and software methods, herein described, to automatically detect and connect with the cell phone. Ideally he would be a recognizable 'member' of the local network, either by subscription, election, cookie, etc. but even that is not necessary. However, if he is individually or uniquely recognizable, tailoring of advertising, services, specials, promotions, etc can be performed to the mutual advantage of the individual and the establishment. Even if not individually recognizable, automatically connecting the local network to his cell phone offers compelling cost savings for business. For example, using the individual's cell phone as a programmable point of sales ordering terminal (recall the McDonald's example above) can greatly reduce human overhead (i.e., order takers) and the costs associated.

One final method of identifying an individual contemplated is by the chain or store to team up with a cellular network provider. In this method, the establishment would be equipped with localized cellular signal sensors and having access to the cellular service providers' database could determine the cell phone's number, user, etc. from the cellular signal emitted by the cell phone when in the establishment. Also, the establishment could attempt to connect the cell phone to its local network via the internet over the cellular signal to the phone or even directly to its local network over the cellular signal without the internet. It could even call the cell phone with a prerecorded message about store specials or other information of interest. It is further contemplated that cellular service providers could do this alone, perhaps renting space for the sensors in the store and then offering the service of customized advertising to client chain stores. Or in some cases, the cellular provider might offer the capability to practice the above methods as an enticement to the consumer to purchase cellular service from them (e.g., Verizon offers the Wal-Mart shopping network exclusively to its customers for example.)

Returning to the dating aspects of the invention, in still another form of the invention, an additional item of information may be voluntarily included in the database of users indicating a participant's willingness to be physically met. If a user is a highly populated area, such as New York or Chicago, and performs a search to identify matches within even a relatively small radius of postal code, one may receive hundreds of potential matches. Using a cell phone and an associated text messaging or chatting program could become quite cumbersome to contact each of these matches to find out if any of the potential matches were even willing to physically meet a potential match. A code or factor may be programmed into a profile, which indicates a participant's willingness to meet physically. This data may comprise one digital bit that the user selects or clears to indicate his or her willingness to meet, thereby greatly reducing the number of matches, or at least greatly improve the relevancy of the matches, found for the intended purpose. However, it is not a necessity to have this feature in order to practice the disclosed inventions.

It should be relatively easy to see that the third embodiment can be used to practice either of the other two methods of operation, i.e., local area or wide area. It does not have quite the customization of those methods but it would certainly work. All an establishment or organization would have to do is be willing to host such an event and arrange some event-serving on the web for participants only. This could be a great gimmick for bars or restaurants, bowling alleys, or whatever at very little cost and the use of the automatic profile enablement with subsequent queries to the user soliciting his business (e.g., buy the special of the day?) could be quite profitable.

In accordance with the above-described inventions, it is contemplated that the participants may not only search for individuals that match his or her criteria, but in addition, users may search for those individuals for whom he is a match. In other words, it is common for one of two participants to match the other's criteria, but it is not as common for both participants to match each other's criteria. Thus, it may be desirable to find out the degree to which you (as a user) match the other participant' criteria. Still further, the degree of "mutual matching" may be indicated. In this manner, any permutation of matching can be searched for and determined.

What is claimed is:

1. A matching system comprising:
a. one or more network interfaces;
b. a non-volatile memory; and
c. one or more servers, including one or more processors, configured to:
   (1) obtain, through a first network communication with a first device that is wireless, a name and an identifying photo of a user including at least a portion of the user's face, and store the name and the identifying photo on the non-volatile memory;
   (2) determine that the first device is located at a business location based upon received geographic information from the first device obtained using a geographic location sensor of the first device;
   (3) transmit, via a second network communication to a second device at the business location, information configured to enable the display of the name and the identifying photo of the user on the second device (i) in response to determining that the first device is located at the business location based upon received geographic information from the first device obtained using the geographic location sensor of the first device and (ii) after receiving authorization from the user to do so; and
   (4) request for a payment account associated with the user to be debited to complete a sale of an item to the user at the business location after receiving a request through a third network communication to do so, wherein the third network communication is received after information configured to display the name and the identifying photo of the user on the second device is transmitted to the second device at the business location.

2. The system of claim 1, wherein the one or more servers are further configured to transmit a special offer relating to the business location to the first device.

3. The system of claim 2 wherein the special offer is a coupon.

4. The system of claim 1, wherein the one or more servers are further configured to transmit information to the second device, the information relating to a prior purchase made by the user.

5. The system of claim 1, wherein the one or more servers are further configured to transmit an offer to the first device relating to the business location, the offer being informed, at least in part, upon a prior purchase made by the user at the business location or its affiliate.

6. The system of claim 5, wherein the one or more servers are further configured to report the prior purchase, from a database of user information, to the second device.

7. The system of claim 1, wherein the one or more servers are further configured to determine that the first device is no longer located at the business location based upon received geographic information from the first device obtained using a geographic location sensor of the first device, and to cause the name and the identifying photo of the user to become unavailable to the second device.

8. The system of claim 7, wherein the one or more servers are further configured to send information to the first device to inform the user of appreciation, reward, advertising, or promotional material associated with the business location upon determining that the first device is no longer at the business location.

9. The system of claim 1, wherein the one or more servers are further configured to transmit to the first device a menu including physical items available to purchase from the business location, and to send an indication of an item selected from the menu to the second device.

10. The system of claim 1, further comprising a transmitter located inside the business location to detect that the first device has entered the business location.

11. The system of claim 10, wherein the transmitter located inside the business location utilizes the 802.11 standard for wireless communication.

12. The system of claim 1, wherein the one or more servers are further configured to receive, from the first device via a network communication, a unique identifier associated with the user of the first device that is used by the matching system to identify the user.

13. The system of claim 12, wherein the unique identifier is either: a phone number, a MAC address of the first device, an assigned user number, or a user name.

14. The system of claim 1, wherein the payment account is associated with a credit card.

15. The system of claim 1, wherein the one or more servers are further configured to transmit confirmation of the sale to the first device.

16. The system of claim 1, wherein the one or more servers are further configured to transmit prior purchase information to the first device.

17. The system of claim 1, wherein the one or more servers are further configured to receive purchase information from the first device.

18. The system of claim 1, further comprising a frequency transmitter at the business location configured to detect whether the first device has left the business location.

* * * * *